United States Patent
Kawasaki et al.

(10) Patent No.: US 11,197,221 B2
(45) Date of Patent: Dec. 7, 2021

(54) TERMINAL APPARATUS, CONTROL APPARATUS, AND COMMUNICATION CONTROL METHOD

(71) Applicants: SHARP KABUSHIKI KAISHA, Sakai (JP); FG INNOVATION COMPANY LIMITED, Tuen Mun (HK)

(72) Inventors: Yudai Kawasaki, Sakai (JP); Masafumi Aramoto, Sakai (JP); Yoko Kuge, Sakai (JP)

(73) Assignees: FG Innovation Company Limited, Hong Kong (HK); Sharp Kabushiki Kaisha, Osaka (JP)

( * ) Notice: Subject to any disclaimer, the term of this patent is extended or adjusted under 35 U.S.C. 154(b) by 16 days.

(21) Appl. No.: 16/313,720

(22) PCT Filed: Jun. 29, 2017

(86) PCT No.: PCT/JP2017/023857
§ 371 (c)(1),
(2) Date: Dec. 27, 2018

(87) PCT Pub. No.: WO2018/003902
PCT Pub. Date: Jan. 4, 2018

(65) Prior Publication Data
US 2019/0174387 A1 Jun. 6, 2019

(30) Foreign Application Priority Data
Jun. 30, 2016 (JP) .............................. JP2016-129850

(51) Int. Cl.
*H04W 36/36* (2009.01)
*H04W 8/22* (2009.01)
(Continued)

(52) U.S. Cl.
CPC ............. *H04W 36/36* (2013.01); *H04W 8/22* (2013.01); *H04W 8/24* (2013.01); *H04W 36/08* (2013.01)

(58) Field of Classification Search
CPC ......... H04W 8/22; H04W 8/24; H04W 36/08; H04W 36/36
See application file for complete search history.

(56) References Cited

U.S. PATENT DOCUMENTS 9,832,697 B2 * 11/2017 Kotecha .................. H04W 4/70
9,907,107 B2 * 2/2018 Olsson .............. H04W 36/0083
(Continued)

FOREIGN PATENT DOCUMENTS

CN 101790158 A 7/2010
CN 102487535 A 6/2012
(Continued)

OTHER PUBLICATIONS

"3rd Generation Partnership Project; Technical Specification Group Services and System Aspects; Study on Architecture for Next Generation System (Release 14)", 3GPP TR 23.799 V0.5.0 (May 2016).
(Continued)

*Primary Examiner* — Eric Nowlin
(74) *Attorney, Agent, or Firm* — Imperium Patent Works

(57) ABSTRACT

To provide a communication control means for a handover procedure corresponding to a mobility preferable for a terminal or a communication path, and/or a control means for supporting a preferable handover procedure, and/or a communication control means for establishing a session supporting a preferable handover procedure. This provides the communication control means for providing the types of mobility preferable for the terminal and the communication path, and the handover for realizing diversified mobility.

4 Claims, 20 Drawing Sheets

(51) Int. Cl.
*H04W 8/24* (2009.01)
*H04W 36/08* (2009.01)

(56) References Cited

U.S. PATENT DOCUMENTS

| | | | | |
|---|---|---|---|---|
| 10,244,433 | B2* | 3/2019 | Nenner | H04W 36/0061 |
| 2009/0129342 | A1 | 5/2009 | Hwang et al. | H04W 36/00 370/331 |
| 2009/0305704 | A1* | 12/2009 | Kato | H04W 36/26 455/437 |
| 2010/0027503 | A1* | 2/2010 | Eravelli | H04W 36/02 370/331 |
| 2010/0216462 | A1* | 8/2010 | Aso | H04W 92/02 455/434 |
| 2011/0096660 | A1* | 4/2011 | Ikeda | H04W 36/36 370/225 |
| 2011/0206013 | A1* | 8/2011 | Aramoto | H04W 36/14 370/332 |
| 2011/0249654 | A1* | 10/2011 | Yu | H04W 60/04 370/331 |
| 2011/0255409 | A1* | 10/2011 | Aramoto | H04W 36/0027 370/236 |
| 2011/0261786 | A1* | 10/2011 | Bontu | H04W 12/0802 370/331 |
| 2012/0163219 | A1* | 6/2012 | Lee | H04W 60/005 370/252 |
| 2012/0218897 | A1* | 8/2012 | Aramoto | H04W 36/28 370/235 |
| 2015/0023322 | A1* | 1/2015 | Aramoto | H04W 36/26 370/331 |
| 2015/0038150 | A1* | 2/2015 | Wang | H04W 8/02 455/438 |
| 2016/0007385 | A1 | 1/2016 | Sedlacek et al. | H04W 76/02 76/2 |
| 2016/0050601 | A1 | 2/2016 | Jeong et al. | H04W 36/14 36/14 |
| 2016/0183156 | A1* | 6/2016 | Chin | H04L 61/2007 370/331 |
| 2016/0270142 | A1* | 9/2016 | Olsson | H04W 8/18 |
| 2017/0048695 | A1* | 2/2017 | Eke | H04W 8/02 |
| 2017/0180429 | A1* | 6/2017 | Osterlund | H04L 65/1006 |
| 2017/0289881 | A1* | 10/2017 | Kotecha | H04W 48/16 |
| 2017/0289882 | A1* | 10/2017 | Faccin | H04L 45/24 |
| 2017/0325055 | A1 | 11/2017 | Enomoto et al. | |
| 2017/0332284 | A1* | 11/2017 | Nenner | H04W 36/08 |
| 2018/0234792 | A1 | 8/2018 | Enomoto et al. | |
| 2019/0059052 | A1* | 2/2019 | Nord | H04W 36/14 |
| 2019/0116484 | A1* | 4/2019 | Wang | H04W 36/36 |
| 2019/0174375 | A1* | 6/2019 | Hapsari | H04W 36/02 |
| 2019/0207811 | A1* | 7/2019 | Wang | H04W 8/08 |
| 2019/0261240 | A1* | 8/2019 | Fang | H04W 36/0027 |
| 2019/0261264 | A1* | 8/2019 | Lou | H04W 48/18 |
| 2019/0274177 | A1* | 9/2019 | Kuge | H04W 48/12 |
| 2020/0053615 | A1* | 2/2020 | Chiba | H04W 60/04 |
| 2020/0068449 | A1* | 2/2020 | Jin | H04W 36/08 |
| 2020/0100147 | A1* | 3/2020 | Youn | H04W 36/0058 |
| 2020/0128461 | A1* | 4/2020 | Li | H04W 36/0011 |
| 2020/0275515 | A1* | 8/2020 | Li | H04W 76/27 |
| 2020/0280836 | A1* | 9/2020 | Velev | H04W 8/12 |
| 2020/0336948 | A1* | 10/2020 | Kawasaki | H04W 8/06 |
| 2020/0336964 | A1* | 10/2020 | Kawasaki | H04W 8/08 |

FOREIGN PATENT DOCUMENTS

| | | |
|---|---|---|
| CN | 108605270 A | 9/2018 |
| CN | 109076423 A | 12/2018 |
| JP | 2007-019982 A | 1/2007 |
| WO | 2009-157171 A1 | 12/2009 |
| WO | 2011-055787 A1 | 5/2011 |
| WO | 2016/076255 A1 | 5/2016 |

OTHER PUBLICATIONS

Office action of the Chinese Patent Office in foreign related application CN201780038157.5 dated Aug. 13, 2021 citing references A-E (6 pages).

* cited by examiner

FIG. 5B

| IMSI |
|---|
| EMM State |
| GUTI |
| ME Identity |
| Mobility Type |
| Handover Information |

FIG. 5C

| APN in Use (Data Network Identifier) |
|---|
| Assigned Session Type (Assigned PDN Type) |
| IP Address(es) |
| Default Bearer |
| Mobility Type |
| Handover Information |

FIG. 5D

| EPS Bearer ID |
|---|
| TI |
| TFT |

| |
|---|
| IMSI |
| MSISDN |
| MM State |
| GUTI |
| ME Identity |
| UE Radio Access Capability |
| UE Network Capability |
| MS Network Capability |
| Access Restriction |
| MME F-TEID |
| SGW F-TEID |
| eNB Address |
| MME UE S1AP ID |
| eNB UE S1AP ID |
| 5GBS Address |
| 5GBS ID |
| WAG Address |
| WAG ID |
| Mobility Type |
| Handover Information |

| |
|---|
| APN in Use (Data Network Identifier) |
| Assigned Session Type (PDN Type) |
| IP Address(es) |
| PGW F-TEID |
| SCEF ID |
| Default bearer |
| Mobility Type |
| Handover Information |

FIG. 9D

| |
|---|
| EPS Bearer ID |
| TI |
| TFT |
| SGW F-TEID |
| PGW F-TEID |
| MME F-TEID |
| eNB/5GBS/WAG address |
| eNB/5GBS/WAG ID |

FIG. 11B

| IMSI |
|---|
| ME Identity |
| MSISDN |
| MME F-TIED |
| SGW F-TIED |

FIG. 11C

| APN in Use (Data Network Identifier) |
|---|
| Assigned Session Type (PDN Type) |
| SGW F-TEID |
| PGW F-TEID |
| Default Bearer |
| IP Address(es) |

FIG. 11D

| EPS Bearer ID |
|---|
| TFT |
| PGW F-TEID |
| SGW F-TEID |
| eNB F-TEID |
| MME/5GBS/WAG address |
| MME/5GBS/WAG ID |

FIG. 12B

| IMSI |
|---|
| ME Identity |
| MSISDN |
| RAT type |

FIG. 12C

| APN in Use (Data Network Identifier) |
|---|

FIG. 12D

| Assigned Session Type (PDN Type) |
|---|
| IP Address(es) |
| SGW F-TEID |
| PGW F-TEID |
| Default Bearer |

FIG. 12E

| EPS Bearer ID |
|---|
| TFT |
| SGW F-TEID |
| PGW F-TEID |

| |
|---|
| User Identity |
| APN in Use (Data Network Identifier) |
| EPS Bearer ID |
| Serving Node Information |

FIG. 13B

TERMINAL APPARATUS, CONTROL APPARATUS, AND COMMUNICATION CONTROL METHOD

TECHNICAL FIELD

The present invention relates to a terminal apparatus, a control apparatus, and a communication control method. This application claims priority based on JP 2016-129850 filed on Jun. 30, 2016 in Japan, the contents of which are incorporated herein in its entirety by reference.

BACKGROUND ART

The 3rd Generation Partnership Project (3GPP), which undertakes activities for standardizing recent mobile communication systems, discusses System Architecture Enhancement (SAE), which is system architecture of the Long Term Evolution (LTE). The 3GPP is in the process of creating specifications for the Evolved Packet System (EPS) as a communication system for realizing an all-IP architecture. Note that a core network constituting the EPS is called the Evolved Packet Core (EPC).

In recent years, the 3GPP also discusses the next generation communication technology or system architecture of the 5th Generation (5G) mobile communication system that is the next generation mobile communication system, where Architecture for Next Generation System (NextGen) is discussed as the next generation mobile communication technology. In the NextGen, technical problems for connecting various terminals to a cellular network are extracted to standardize solutions.

For example, required conditions include optimization or diversification of mobility for simultaneously supporting various terminals including a terminal with a lower frequency of movement such as those fixed and a terminal with a higher frequency of movement such as those mounted on a car or the like, optimization of corresponding communication procedure or system architecture, and the like.

CITATION LIST

Non Patent Literature

NPL 1: 3rd Generation Partnership Project; Technical Specification Group Services and System Aspects; Study on Architecture for Next Generation System; (Release 14)

SUMMARY OF INVENTION

Technical Problem

In the NextGen, discussion is made on optimization of the terminal mobility. To be more specific, the discussion is made on providing the mobility suitable to the terminal or a network by diversifying kinds of terminal mobility.

However, the kinds of terminal mobility, a procedure to select the kind of mobility suitable for the terminal, and means for realizing handover for the diversified mobility are not clarified. The present invention has been made in view of such a situation, and has an object to provide communication control means for providing the kinds of mobility preferable for a terminal and a communication path, and a handover for realizing diversified mobility.

Solution to Problem

A terminal apparatus according to the present invention includes a transmission and/or reception unit configured to receive a session establishment accept message including at least first identification information and/or second identification information from a core network in a session establishment procedure performed in a mode where an attach procedure is completed, wherein the first identification information is information indicating that the core network includes a function to perform a handover procedure initiated by the terminal apparatus to start, and the second identification information is information indicating that the terminal apparatus is allowed to perform a handover procedure initiated by the terminal apparatus to start.

A communication control method of a terminal apparatus according to the present invention includes the step of receiving a session establishment accept message including at least first identification information and/or second identification information from a core network in a session establishment procedure performed in a mode where an attach procedure is completed, wherein the first identification information is information indicating that the core network includes a function to perform a handover procedure initiated by the terminal apparatus to start, and the second identification information is information indicating that the terminal apparatus is allowed to perform a handover procedure initiated by the terminal apparatus to start.

A control apparatus included in a core network according to the present invention includes a transmission and/or reception unit configured to transmit a session establishment accept message including at least first identification information and/or second identification information to a terminal apparatus in a session establishment procedure performed in a mode where an attach procedure is completed, wherein the first identification information is information indicating that the core network includes a function to perform a handover procedure initiated by the terminal apparatus to start, and the second identification information is information indicating that the terminal apparatus is allowed to perform a handover procedure initiated by the terminal apparatus to start.

A communication control method of a control apparatus included in a core network according to the present invention includes the step of transmitting a session establishment accept message including at least first identification information and/or second identification information to a terminal apparatus in a session establishment procedure performed in a mode where an attach procedure is completed, wherein the first identification information is information indicating that the core network includes a function to perform a handover procedure initiated by the terminal apparatus to start, and the second identification information is information indicating that the terminal apparatus is allowed to perform a handover procedure initiated by the terminal apparatus to start.

Advantageous Effects of Invention

According to the present invention, the terminal can realize connectivity establishment and the handover depending on mobility capability. The core network can connect with the terminals having the different mobility capabilities, or establish the communication paths having the different mobility capabilities, and realize the handover.

BRIEF DESCRIPTION OF DRAWINGS

FIGS. 2A and 2B are diagrams illustrating an example of a configuration of the mobile communication network, and the like.

FIGS. 3A and 3B are diagrams illustrating an example of a configuration of the mobile communication network, and the like.

FIGS. 5B to 5D are diagrams illustrating a storage unit of the UE.

FIG. 8B is a diagram illustrating a storage unit of the MME.

FIGS. 9C and 9D are diagrams illustrating the storage unit of the MME.

FIGS. 11B to 11D are diagrams illustrating a storage unit of the SGW.

FIGS. 12B to 12E are diagrams illustrating a storage unit of the PGW.

FIG. 13B is a diagram illustrating a storage unit of the SCEF.

DESCRIPTION OF EMBODIMENTS

Hereinafter, a preferred embodiment for carrying out the present invention will be described with reference to the drawings. Note that as an example, the present embodiment describes an embodiment of a mobile communication system to which the present invention is applied.

1. Embodiment

1.1. System Overview

Figure 1:
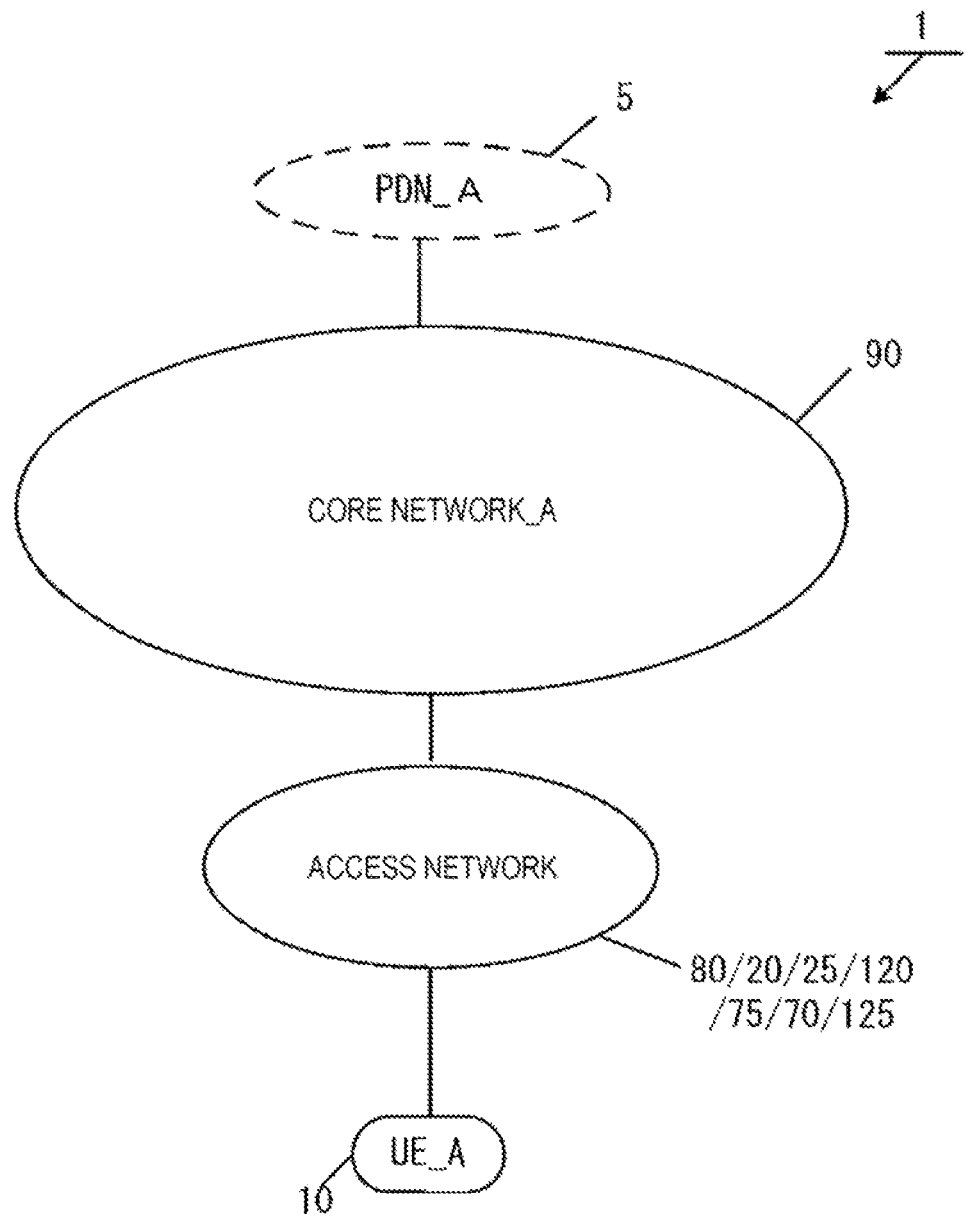
FIG. 1 is a diagram illustrating an overview of a mobile communication system.

FIG. 1 is a diagram illustrating an overview of a mobile communication system according to the present embodiment. As illustrated in the figure, a mobile communication system 1 includes a mobile terminal apparatus UE_A 10, an access network, a core network_A 90, and a Packet Data Network (PDN)_A 5. Here, the UE_A 10 may be any wirelessly connectable terminal apparatus, and may be a User Equipment (UE), a Mobile Equipment (ME), or a Mobile Station (MS). The UE_A 10 may be a Cellular Internet of Things (CIoT) terminal. Note that the CIoT terminal is an Internet of Things (IoT) terminal connectable with the core network_A 90, the IoT terminal includes a mobile phone terminal such as a smartphone, and may be various IT devices such as a personal computer and a sensor device.

The UE_A 10 is capable of connecting to the access network and/or the core network_A 90. Furthermore, the UE_A 10 is capable of connecting to the PDN_A 5 via the access network and/or the core network_A 90 to transmit and/or receive user data to and/or from the PDN_A 5. The user data may be data transmitted and/or received between the UE_A 10 and the PDN_A 5. The user data may be transmitted and/or received using a Packet Data Unit (PDU) session. Communication of the user data is not limited to IP communication and may be non-IP communication.

Here, the PDU session is connectivity established between the UE_A 10 and the PDN_A 5 to provide a PDU connectivity service for transmitting and/or receiving the user data and the like between the UE_A 10 and the PDN_A 5. To be more specific, the PDU session may be connectivity established between the UE_A 10 and an external gateway device. Here, the external gateway device may be a device such as a PGW_A 30 and a SCEF_A 46 which connect the core network_A 90 with the PDN_A 5.

The PDU session may be a communication path established to transmit and/or receive the user data between the UE_A 10 and the core network_A 90 and/or the PDN_A 5, and may be a communication path for transmitting and/or receiving a PDU. Furthermore, the PDU session may be a session established between the UE_A 10 and the core network_A 90 and/or the PDN_A 5, and may be a logical communication path including a transfer path such as one or multiple bearers between devices in the mobile communication system 1. To be more specific, the PDU session may be a connection established by the UE_A 10 between the core network_A 90 and the external gateway device, and may be a connection such as a Packet Data Network Connection (PDN) connection established between the UE_A 10 and the PGW_A 30 and/or the SCEF_A 46.

The PDU session may be connectivity and/or connection between the UE_A 10 and the PGW_A 30 via an eNB_A 45 and/or the SGW_A 35, and may be connectivity and/or connection between the UE_A 10 and the SCEF_A 46 via the eNB_A 45 and/or a MME_A 40. Here, assume that the PDU session established between the UE_A 10 and the PGW_A 30 via the devices in the access network and the SGW_A 35 is defined as a first PDU session, and the PDU session established between the UE_A 10 and the SCEF_A 46 via the devices in the access network and the MME_A 40 is defined as a second PDU session.

Devices such as an application server located in the UE_A 10 and the PDN_A 5 can transmit and/or receive the user data by using the PDU session. In other words, the PDU session can transfer the user data which is transmitted and/or received by the devices such as the application server located in the UE_A 10 and the PDN_A 5. The devices (the UE_A 10 and/or the devices in the access network and/or the devices in the core network_A 90) may associate one or multiple pieces of identification information with the PDU session for management. These pieces of identification information may include one or more pieces of an APN, a TFT, a session type, application identification information, identification information of the PDN_A 5, network slice identification information, and access network identification information, and may further include other information. In a case that multiple PDU sessions are established, the respective pieces of identification information associated with the PDU sessions may have the same content, or different contents.

The IP communication is communication of data using an Internet Protocol (IP), and is data communication achieved through transmitting and/or receiving an IP packet which is given an IP header. A payload part constituting an IP packet may contain the user data transmitted and/or received by the UE_A 10. The non-IP communication is communication not using an IP, and is data communication achieved through transmitting and/or receiving data which is not given an IP header. For example, the non-IP communication may be the data communication achieved through transmitting and/or receiving application data not given the IP packet, or may transmit and/or receive the user data transmitted and/or received by the UE_A 10 to which another header such as a MAC header and an Ethernet (trade name) frame header is given.

The PDN_A 5 is a Data Network (DN) to provide a communication service to the UE_A 10. The DN may be configured as a packet data service, or configured for each service. The PDN_A 5 may include a connected communication terminal. Therefore, connecting with the PDN_A 5 may refer to connecting with the communication terminal located in the PDN_A 5, and further, transmitting and/or receiving the user data to and/or from the PDN_A 5 may refer to transmitting and/or receiving the user data to and/or from the communication terminal located in the PDN_A 5.

Furthermore, the access network, the access network is a radio network connecting with the UE_A 10 and/or the core network_A 90. The access network may be a 3GPP access network, or a non-3GPP access network. The 3GPP access network may be an Evolved Universal Terrestrial Radio Access Network (E-UTRAN)_A 80, a Universal Terrestrial Radio Access Network (UTRAN)_A 20, a GSM (trade name) EDGE Radio Access Network (GERAN)_A 25, and a Next Generation Radio Access Network (NextGen RAN)_A 120, and the non-3GPP access network may be a WLAN ANb 75, a WLAN ANa 70, an WLAN ANc 125. The UE_A 10 may connect with the access network in order to connect to the core network_A 90, or may connect to the core network_A 90 via the access network.

Furthermore, the core network_A 90 is an IP mobile communication network provided by a Mobile Operator connected with the access network and/or the PDN_A 5. The core network_A 90 may be a core network for the mobile operator that operates and manages the mobile communication system 1, or may be a core network for a virtual mobile operator such as a Mobile Virtual Network Operator (MVNO). Alternatively, the core network_A 90 may be a core network for accommodating the CIoT terminal. The core network_A 90 may be an Evolved Packet Core (EPC) for an Evolved Packet System (EPS), or may be a Next Generation Core (NextGen Core) for a Next Generation System (NextGen System).

Next, examples of a configuration of the core network_A 90 will be described. In the present embodiment, two configuration examples of the core network_A 90 will be described. The core network_A 90 may be a first core network, or a second core network, or a combination thereof. The first core network may be an EPC, and the second core network may be a NextGen Core. The first core network and/or the second core network may be configured to include a system optimized for the IoT.

Figure 2A:
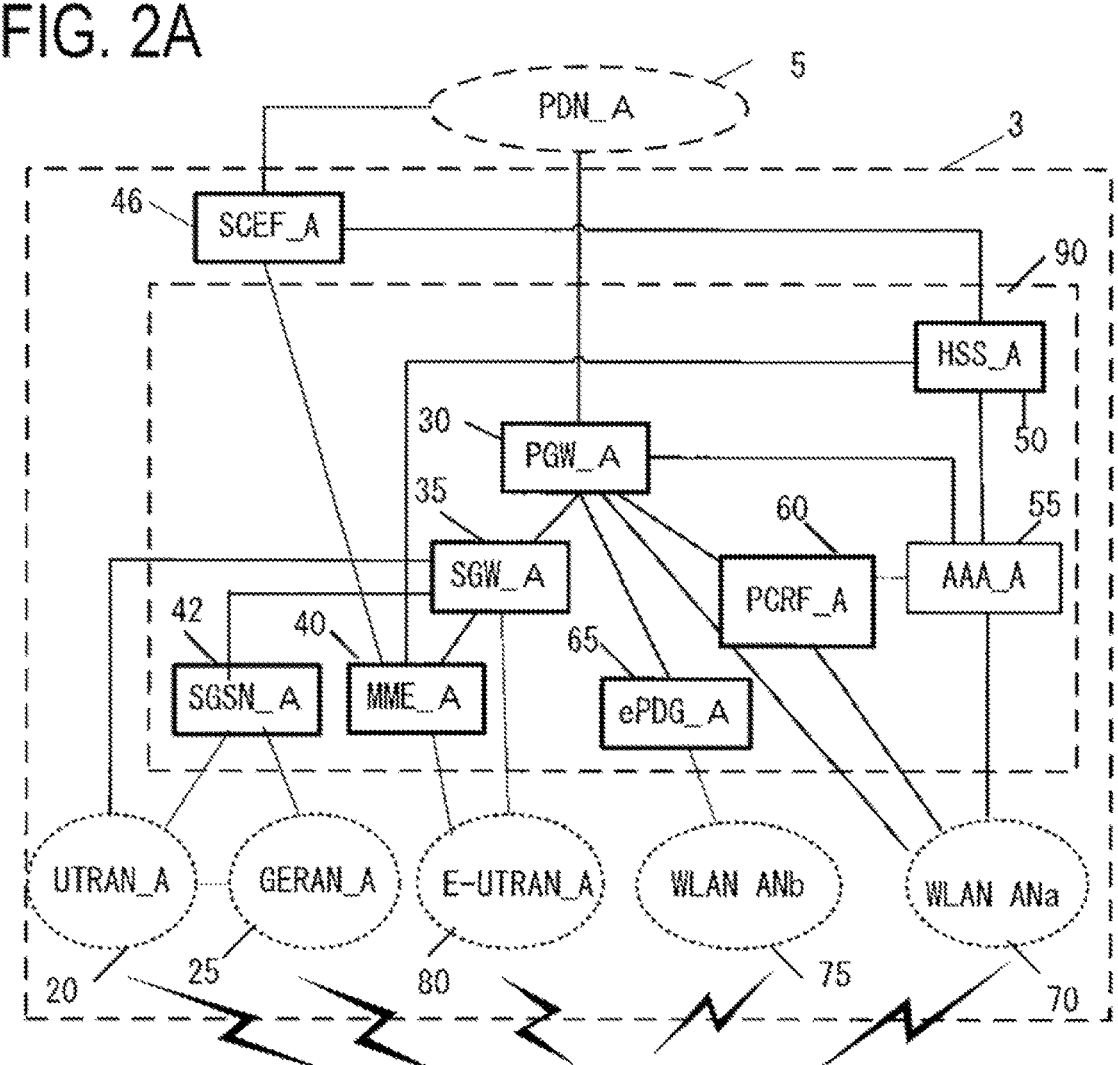
Figure 2B:
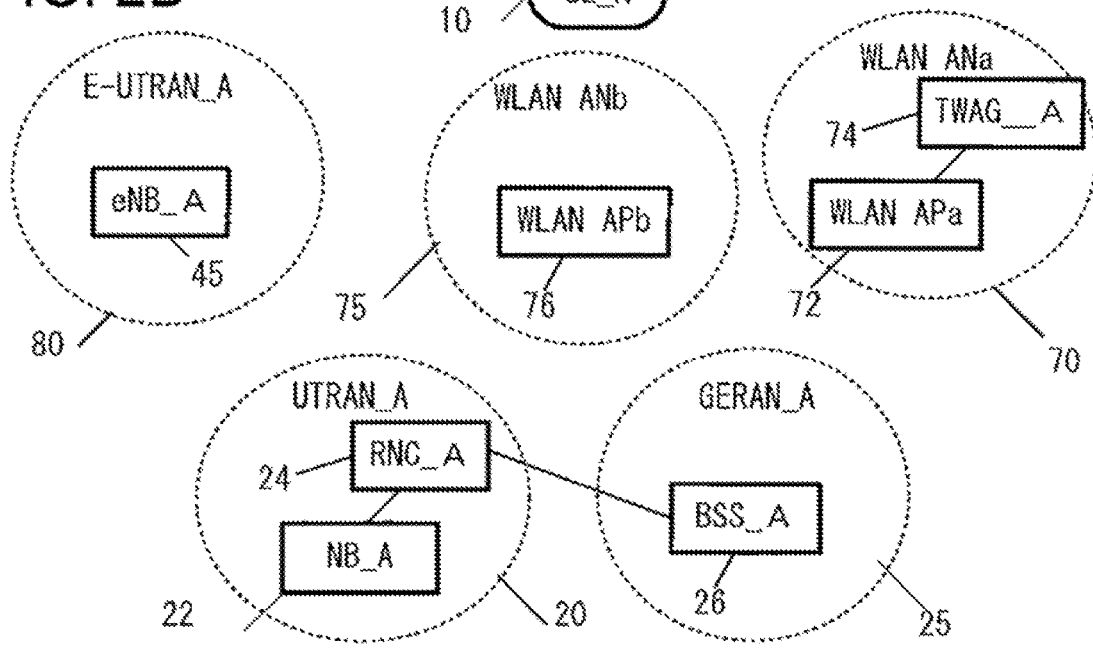

First, FIGS. 2A and 2B illustrate an example of the configuration of the core network_A 90 in a case that the core network_A 90 is the first core network. The core network_A 90 in FIG. 2A includes a Home Subscriber Server (HSS)_A 50, an Authentication Authorization Accounting (AAA)_A 55, a Policy and Charging Rules Function (PCRF)_A 60, a Packet Data Network Gateway (PGW)_A 30, an enhanced Packet Data Gateway (ePDG)_A 65, a Serving Gateway (SGW)_A 35, a Mobility Management Entity (MME)_A 40, a Serving GPRS Support Node (SGSN)_A 42, and a Service Capability Exposure Function (SCEF)_A 46. Furthermore, the core network_A 90 is capable of connecting to multiple radio access networks (E-UTRAN_A 80, WLAN ANb 75, WLAN ANa 70, UTRAN_A 20, and GERAN_A 25).

Such a radio access network may be configured by connecting to multiple different access networks, or may be configured by connecting to either one of the access networks. Moreover, the UE_A 10 is capable of wirelessly connecting to the radio access network. Moreover, the WLAN access network b (WLAN ANb 75) that connects to the core network via the ePDG_A 65 and the WLAN access network a (WLAN ANa 70) that connects to the PGW_A 30, the PCRF_A 60, and the AAA_A 55 can be configured as access networks connectable in a WLAN access system. Note that each device has a similar configuration to those of the devices of the related art in a mobile communication system using EPS, and thus detailed descriptions thereof will be omitted. Each device will be described briefly hereinafter.

The PGW_A 30 is connected to the PDN_A 5, the SGW_A 35, the ePDG_A 65, the WLAN ANa 70, the PCRF_A 60, and the AAA_A 55 and is a relay device configured to transfer user data by functioning as a gateway device between the PDN_A 5 and/or the DN and the core network_A 90. The PGW_A 30 may be a gateway device for the IP communication and/or the non-IP communication. The PGW_A 30 may have a function to transfer the IP communication, or may have a function to convert between the non-IP communication and the IP communication. Multiple gateways like this may be located in the core network_A 90. Furthermore, multiple gateways connecting the core network_A 90 and a single DN may be also located.

The PGW_A 30 may be a UP network device (U-Plane Network Function) which is connected with the PDN_A 5 and transfers the user data, or may be a User Plane Gateway (UP GW) which is a gateway between the PDN_A 5 and the core network for the user data.

The SGW_A 35 is connected to the PGW 30, the MME_A 40, the E-UTRAN_A 80, the SGSN_A 42, and the UTRAN_A 20, and serves as a relay device configured to transfer user data by functioning as a gateway device between the core network_A 90 and the 3GPP access network (the UTRAN_A 20, the GERAN_A 25, the E-UTRAN_A 80).

The SGW_A 35 may be a UP network device (U-Plane Network Function) which is connected with the access network and transfers the user data, or may be a User Plane Gateway (UP GW) which is a gateway between the access network and the core network for the user data.

The MME_A 40 is connected to the SGW_A 35, the access network, the HSS_A 50, and the SCEF_A 46, and is a control apparatus that carries out location information management including mobility management and access control for the UE_A 10 via the access network. The MME_A 40 may further include a function as a session management device to manage a session established by the UE_A 10. Multiple control apparatuses like this may be located in the core network_A 90. For example, a location management device different from the MME_A 40 may be configured. As with the MME_A 40, the location management device different from the MME_A 40 may be connected with the SGW_A 35, the access network, the SCEF_A 46, and the HSS_A 50.

Furthermore, in a case that multiple MMEs are included in the core network_A 90, the MMEs may be connected to each other. With this configuration, a context of the UE_A 10 may be transmitted and/or received between the MMEs. From the description, the MME_A 40 is a management device that transmits and/or receives the control information associated with the mobility management or session management to and/or from the UE_A 10, and in other words, may be a control apparatus for a control plane.

The example is described in which the MME_A 40 is configured to be included in the core network_A 90, but the MME_A 40 may be a management device connected to one or more core networks in a case that multiple core networks or network slices are configured, or the MME_A 40 may be a management device connected to multiple network slices.

Multiple core networks or network slices may be networks provided by a single communication provider, or may be networks provided by different communication providers. Here, the network slice may be a logical network configured to divide the user data to be delivered depending on services or the like. The network slice may be a network slice instance.

The MME_A 40 may be a relay device configured to transfer user data as a gateway device between the core network_A 90 and the access network. The user data transmitted and/or received by the MME_A 40 as a gateway device may be small data.

The MME_A 40 may be a network device (Network Function) serving a function of the mobility management of the UE_A 10 and the like, a network device serving a function of the session management for the PDU session or the like, or a network device managing one or multiple network slices. The MME_A 40 may be a network device serving a function of one or multiple of these functions. The network device may be one or multiple devices located in the core network_A 90, a C-Plane control apparatus (Control Plane Function) for the control information and/or a control message, or a common C-Plane control apparatus (Common Control Plane Function) common to multiple network slices.

The HSS_A 50 is connected to the MME_A 40, the AAA_A 55, and the SCEF_A 46, and is a managing node configured to manage subscriber information. The subscriber information of the HSS_A 50 is referred to during MME_A 40 access control, for example. Moreover, the HSS_A 50 may be connected to the location management device different from the MME_A 40. The AAA_A 55 is connected to the PGW_A 30, the HSS_A 50, the PCRF_A 60, and the WLAN ANa 70, and is configured to perform access control for the UE_A 10 connected via the WLAN ANa 70.

The PCRF_A 60 is connected to the PGW_A 30, the WLAN ANa 70, the AAA_A 55, and the PDN_A 5 and is configured to perform QoS management on data delivery. For example, the PCRF_A 60 manages QoS of a communication path between the UE_A 10 and the PDN_A 5. The ePDG_A 65 is connected to the PGW_A 30 and the WLAN ANb 75 and is configured to deliver user data by functioning as a gateway device between the core network_A 90 and the WLAN ANb 75.

The SGSN_A 42 is connected to the UTRAN_A 20, the GERAN_A 25, and the SGW_A 35 and is a control apparatus for location management between a 3G/2G access network (UTRAN/GERAN) and the LTE access network (E-UTRAN). In addition, the SGSN_A 42 has functions of: selecting the PGW and the SGW; managing a time zone of the UE_A 10; and selecting the MME at the time of handover to the E-UTRAN.

The SCEF_A 46 is connected to the PDN_A 5, the MME_A 40, and the HSS_A 50, and is a relay device configured to transfer user data as a gateway device connecting the PDN_A 5 and/or the DN and the core network_A 90. The SCEF_A 46 may be a gateway device for the non-IP communication. The SCEF_A 46 may have a function to convert between the non-IP communication and the IP communication. Multiple gateways like this may be located in the core network_A 90. Furthermore, multiple gateways connecting the core network_A 90 and a single DN may be also located.

Additionally, as illustrated in FIG. 2B, each radio access network includes devices to which the UE_A 10 is actually connected (such as a base station apparatus and an access point device), and the like. The devices used in these connections can be thought of as devices adapted to the radio access networks.

In the present embodiment, the E-UTRAN_A 80 is an access network of Long Term Evolution (LTE), and is configured to include the evolved Node B (eNB)_A 45. The eNB_A 45 is a radio base station to which the UE_A 10 connects through an Evolved Universal Terrestrial Radio Access (E-UTRA), and the E-UTRAN_A 80 may include one or multiple eNBs_A 45. Furthermore, the multiple eNBs may be connected to each other.

The UTRAN_A 20 is a 3G access network, and configured to include a Radio Network Controller (RNC)_A 24 and a Node B (NB)_A 22. The NB_A 22 is a radio base station to which the UE_A 10 connects through a Universal Terrestrial Radio Access (UTRA), and the UTRAN_A 20 may be configured to include one or multiple radio base stations. Furthermore, the RNC_A 24 is a control unit configured to connect the core network_A 90 and the NB_A 22, and the UTRAN_A 20 may be configured to include one or multiple RNCs. Moreover, the RNC_A 24 may be connected to one or multiple NBs_A 22. In addition, the RNC_A 24 may be connected to a radio base station (Base Station Subsystem (BSS)_A 26) included in the GERAN_A 25.

The GERAN_A 25 is a 2G access network, and is configured to include the BSS_A 26. The BSS_A 26 is a radio base station to which the UE_A 10 connects through GSM (trade name)/EDGE Radio Access (GERA), and the GERAN_A 25 may be constituted of one or multiple radio base station BSSs. Furthermore, the multiple BSSs may be connected to each other. Moreover, the BSS_A 26 may be connected to the RNC_A 24.

The WLAN ANa 70 is a radio LAN access network, and is configured to include a WLAN Access Point (WLAN AP) a 72 and a Trusted WLAN Access Gateway (TWAG)_A 74. The WLAN APa 72 is a radio base station to which the UE_A 10 connects in the WLAN access system trusted by the operator providing the core network_A 90, and the WLAN ANa 70 may be configured to include one or multiple radio base stations. The TWAG_A 74 serves as a gateway device between the core network_A 90 and the WLAN ANa 70. The WLAN APa 72 and the TWAG_A 74 may be configured as a single device. Even in a case that the operator providing the core network_A 90 and the operator providing the WLAN ANa 70 are different, such a configuration can be implemented through contracts and agreements between the operators.

The WLAN ANb 75 is a radio LAN access network, and is configured to include a WLAN Access Point (WLAN AP)

b 76. The WLAN APb 76 is a radio base station to which the UE_A 10 connects in the WLAN access system in a case that no trusting relationship is established with the operator running the core network_A 90, and the WLAN ANb 75 may include one or multiple radio base stations.

In this manner, the WLAN ANb 75 is connected to the core network_A 90 via the ePDG_A 65, which is a device included in the core network_A 90, serving as a gateway. The ePDG_A 65 has a security function for ensuring security.

Figure 3A:
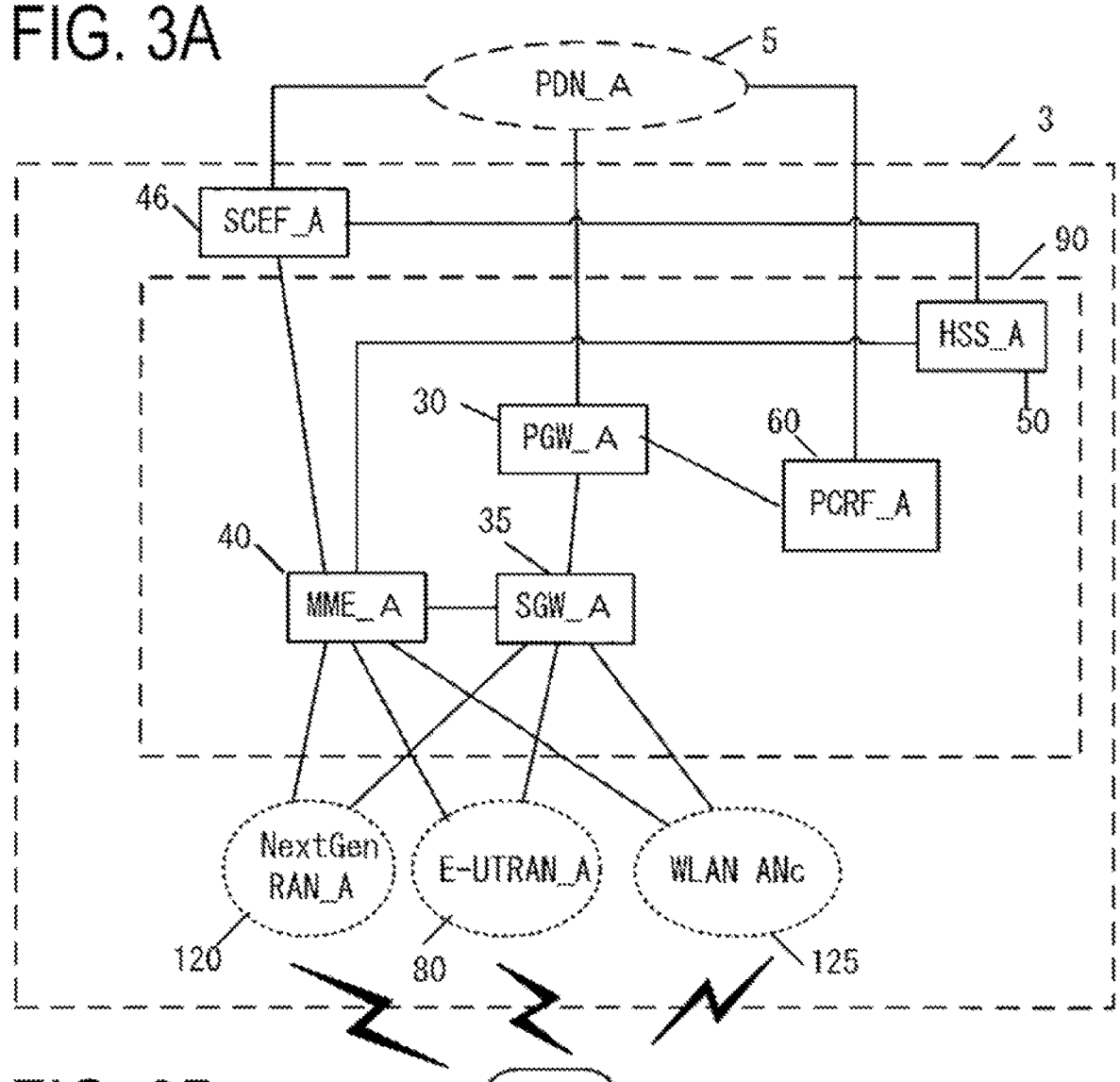
Figure 3B:
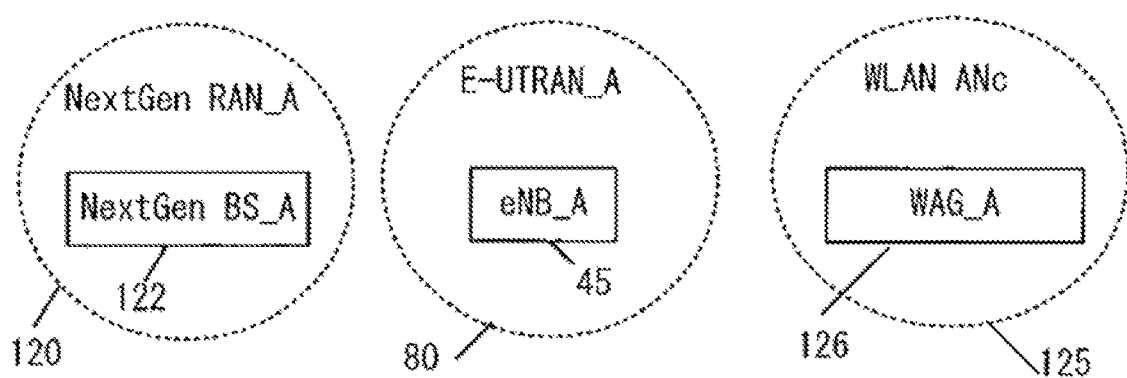

Next, a description is given of an example of the configuration of the core network_A 90 in a case that the core network_A 90 is the second core network. FIGS. 3A and 3B illustrate an example of the configuration of the core network_90. The core network_A 90 in FIG. 3A includes the HSS_A 50, the PCRF_A 60, the PGW_A 30, the SGW_A 35, the MME_A 40, and the SCEF_A 46.

The core network_A 90 is capable of connecting to multiple radio access networks (E-UTRAN_A 80, NextGen RAN_A 120, and WLAN ANc 125). Such a radio access network may be configured by connecting to multiple different access networks, or may be configured by connecting to either one of the access networks. Moreover, the UE_A 10 is capable of wirelessly connecting to the radio access network.

Furthermore, the E-UTRAN_A 80 and the NextGen RAN_A 120 can be configured as access networks connectable in a 3GPP access system. The WLAN access network c (WLAN ANc 125) that connects to the MME_A 40 and the SGW_A 35 can be configured as an access network connectable in the WLAN access system. Note that respective devices have configurations similar to the devices in the first core network, and therefore, detailed descriptions thereof are omitted. Each device will be described briefly hereinafter.

The PGW_A 30 is a device connected to the PDN_A 5, the SGW_A 35, and the PCRF_A 60. The SGW_A 35 is a device connected to the PGW_A 30, the MME_A 40, the E-UTRAN_A 80, the NextGen RAN_A 120, and the WLAN ANc 125. The MME_A 40 is a device connected to the SGW_A 35, the E-UTRAN_A 80, the NextGen RAN_A 120, the WLAN ANc 125, the HSS_A 50, and the SCEF_A 46. Functions served by the PGW_A 30, SGW_A 35, and MME_A 40 may be the same as the functions of corresponding devices described in the first core network. Configurations of and functions served by the SCEF_A 46, HSS_A 50, and PCRF_A 60 may be the same as those for corresponding devices described in the first core network. Therefore, descriptions of these functions and configurations will be omitted.

Additionally, as illustrated in FIG. 3B, each radio access network includes devices to which the UE_A 10 is actually connected (such as a base station apparatus and an access point device), and the like. The devices used in these connections can be thought of as devices adapted to the radio access networks.

In the present embodiment, the NextGen RAN_A 120 is a 5G access network, and is configured to include a Next Generation Base Station (NextGen BS)_A 122. The NextGen BS_A 122 is a radio base station to which the UE_A 10 connects through a Next Generation Radio Access (NextGen RA), and the NextGen RAN_A 120 may be configured to include one or multiple NextGen BSs_A 122.

The WLAN ANc 125 is a radio LAN access network, and is configured to include a WAG_A 126. The WLAN Access Gateway (WAG)_A 126 is a radio base station to which the UE_A 10 connects through a radio LAN access, and the WLAN ANc 125 may be configured to include one or multiple WAGs_A 126. The WAG_A 126 may be a gateway device between the core network_A 90 and the WLAN ANc 125. The WAG_A 126 may have a function unit for the radio base station and a function unit for the gateway device which are configured as different devices.

Note that herein, the UE_A 10 being connected to radio access networks refers to the UE_A 10 being connected to a base station apparatus, an access point, or the like included in each of the radio access networks, and data, signals, and the like being transmitted and/or received also pass through those base station apparatuses, access points, or the like.

1.2. Device Configuration

First, a description is given of the identification information stored in each device. International Mobile Subscriber Identity (IMSI) is permanent identification information of a subscriber (user), and is identification information assigned to a user using the UE. The IMSI stored by the UE_A 10, the MME_A 40, and the SGW_A 35 may be the same as the IMSI stored by the HSS_A 50.

An EMM State/MM State indicates a Mobility management state of the UE_A 10 or MME_A 40. For example, the EMM State/MM State may be EMM-REGISTERED state (registered state) that the UE_A 10 is registered in the network and/or EMM-DEREGISTERD state (deregistered state) that the UE_A 10 is not registered in the network. The EMM State/MM State may be ECM-CONNECTED state that a connection is held between the UE_A 10 and the core network_A 90 and/or ECM-IDLE state that the connection is released.

Globally Unique Temporary Identity (GUTI) is temporary identification information about the UE_A 10. The GUTI is constituted of identification information on the MME_A 40 (Globally Unique MME Identifier (GUMMEI)) and identification information on the UE_A 10 in a specific MME_A 40 (M-TMSI). ME Identity is an ID of the UE_A 10 or ME, and may be International Mobile Equipment Identity (IMEI) or IMEI Software Version (IMISV), for example. MSISDN represents a basic phone number of the UE_A 10. The MSISDN stored by the MME_A 40 may be information indicated by a storage unit of the HSS_A 50.

A MME F-TEID is information identifying the MME_A 40. The MME F-TEID may include an IP address of the MME_A 40, a Tunnel Endpoint Identifier (TEID) of the MME_A 40, or both of them. The IP address of the MME_A 40 and the TEID of the MME_A 40 may be stored independently from each other. The MME F-TEID may be identification information for user data, or identification information for control information.

A SGW F-TEID is information identifying the SGW_A 35. The SGW F-TEID may include an IP address of the SGW_A 35, a TEID of the SGW_A 35, or both of them. The IP address of the SGW_A 35 and the TEID of the SGW_A 35 may be stored independently from each other. The SGW F-TEID may be identification information for user data, or identification information for control information.

A PGW F-TEID is information identifying the PGW_A 30. The PGW F-TEID may include an IP address of the PGW_A 30, a TEID of the PGW_A 30, or both of them. The IP address of the PGW_A 30 and the TEID of the PGW_A 30 may be stored independently from each other. The PGW F-TEID may be identification information for user data, or identification information for control information.

An eNB F-TEID is information identifying the eNB_A 45. The eNB F-TEID may include an IP address of the eNB_A 45, a TEID of the eNB_A 45, or both of them. The IP address of the eNB_A 45 and the TEID of the SGW_A 35 may be stored independently from each other. The eNB F-TEID may be identification information for user data, or identification information for control information.

The Access Point Name (APN) may be identification information identifying the core network_A 90 and an external network such as the DN. The APN can be used also as information to select a gateway device such as the PGW_A 30 for connecting to the core network_A 90.

The APN may be identification information identifying such a gateway device, or identification information identifying an external network such as the DN. In a case that multiple gateways connecting the core network_A 90 to the DN are located, multiple gateways may be selectable according to the APN. In a case that one gateway is selected among such multiple gateway devices, another scheme using identification information other than the APN may be used to select the gateway.

UE Radio Access Capability is identification information indicating a radio access capability of the UE_A 10. The UE Network Capability includes an algorithm of security supported by the UE and a key derivative function. MS Network Capability is information including at least one kind of information necessary for the SGSN to the UE having the GERAN and/or UTRAN function. Access Restriction is registration information for access restriction. An eNB Address is an IP address of the eNB_A 45. A MME UE S1AP ID is information identifying the UE in the MME_A 40. An eNB UE S1AP ID is information identifying the UE in the eNB_A 45.

An APN in Use (Data Network Identifier) is an APN recently used. This APN may include identification information about the network and identification information about a default operator. The APN in Use (Data Network Identifier) may be information identifying a DN with which the PDU session is established.

An Assigned Session Type (Assigned PDN Type) is information indicating a PDU session type. The PDU session type may indicate an IP, or a non-IP. In a case that the PDU session type indicate an IP, information indicating a type of PDN assigned by the network may be further included. The Assigned Session Type (Assigned PDN Type) may be IPv4, IPv6, or IPv4v6.

Unless otherwise specifically described, the IP Address refers to the IP address assigned to the UE. The IP address may be an IPv4 address, an IPv6 address, or an IPv6 prefix. In a case that the Assigned Session Type (Assigned PDN Type) indicates a non-IP, an element of the IP Address may not be contained.

A SCEF ID is an IP address of the SCEF_A 46 used in the PDU session. Default Bearer is EPS bearer identification information, which is information acquired and/or generated in establishing a PDU session, for identifying a default bearer associated with the PDU session.

An EPS Bearer ID is identification information of the EPS bearer. The EPS Bearer ID may be identification information identifying a SRB and/or a CRB, or identification information identifying a DRB. A Transaction Identifier (TI) is identification information identifying a bidirectional message flow (Transaction). Note that the EPS Bearer ID may be EPS Bearer identification information identifying a dedicated bearer. Therefore, the EPS bearer ID may be identification information identifying the EPS bearer different from the default bearer. A Traffic Flow Template (TFT) indicates all packet filters associated with the EPS bearer. The TFT is information identifying some pieces of the transmitted and/or received user data, and thus, the UE_A 10 uses the EPS bearer associated with the TFT to transmit and/or receive the user data identified by the TFT. Further in other words, the UE_A 10 uses the RB associated with the TFT to transmit and/or receive the user data identified by the TFT. The TFT may associate the user data such as the transmitted and/or received application data with a proper transfer path, and may be identification information identifying the application data. The UE_A 10 may use the default bearer to transmit and/or receive the user data which cannot be identified by the TFT. The UE_A 10 may store in advance the TFT associated with the default bearer.

The Default Bearer is the EPS bearer identification information identifying a default bearer associated with the PDU session. The EPS bearer may be a logical communication path established between the UE_A 10 and the PGW_A 30. In this case also, the EPS bearer may be configured to include a Radio Bearer (RB) established between the UE_A 10 and the base station in the access network and/or the access point. Furthermore, the RB and the EPS bearer may be associated with each other on a one-to-one basis. Therefore, identification information of the RB may be associated with the identification information of the EPS bearer on a one-to-one basis, or may be the same identification information as of the EPS bearer. The RB may be a Signalling Radio Bearer (SRB) and/or a Control-plane Radio bearer (CRB), or a Data Radio Bearer (DRB). The Default Bearer may be information the UE_A 10 and/or the SGW_A 35 and/or the PGW_A 30 acquire from the core network_A 90 in establishing a PDU session.

A User Identity is information identifying a subscriber. The User Identity may be an IMSI, or a MSISDN. The User Identity may also be identification information other than an IMSI or MSISDN. Serving Node Information is information identifying the MME_A 40 used in the PDU session, and may be an IP address of the MME_A 40.

An eNB/NextGen BS/WAG Address represents IP addresses of the eNB_A 45 and/or the NextGen BS_A 122 and/or the WAG_A 126. An eNB/NextGen BS/WAG ID is information identifying the UE in the eNB_A 45 and/or the NextGen BS_A 122 and/or the WAG_A 126.

A NextGen BS Address is an IP address of the NextGen BS_A 122. The NextGen BS ID is information identifying the UE in the NextGen BS_A 122. The WAG Address is an IP address of the WAG_A 126. The WAG ID is information identifying the UE in the WAG_A 126.

A MME/eNB/NextGen BS/WAG Address represents IP addresses of the MME_A 40 and/or the eNB_A 45 and/or the NextGen BS_A 122 and/or the WAG_A 126. A MME/eNB/NextGen BS/WAG ID is information identifying the UE in the MME_A 40 and/or the eNB_A 45 and/or the NextGen BS_A 122 and/or the WAG_A 126.

A Mobility Type is information indicating granularity of the mobility. The mobility type may be information indicating a type of Service Continuity, information indicating a type of supported mobility, or information about the handover. For example, the mobility type may be a mobility type corresponding to the UE-initiated handover, a mobility type corresponding to a state not allowing the UE-initiated handover to be performed, or a mobility type corresponding to a state not allowing the network-initiated handover to be performed. The mobility type may be a Mobility Class, or a Mobility level.

Handover Information is information about the handover of the UE_A 10 and/or the network (the access network and/or the core network_A 90). The Handover Information may be information indicating a type of supported handover, or permission information of the handover in each state.

The type of supported handover may be a handover in the 3GPP access network or the non-3GPP access network, or a handover between the 3GPP access network and the non-3GPP access network. The permission information of the handover in each state may be information indicating that the handover is allowed in an active mode and/or an idle mode, or information indicating that the handover is not allowed in the active mode and/or the idle mode.

The Handover Information may be information including UE UE-initiated Handover Capability and/or NW UE-initiated Handover Capability and/or UE-initiated Handover allowed and/or NW-initiated Handover allowed.

The UE UE-initiated Handover Capability is capability information indicating whether or not the UE_A 10 supports the UE-initiated handover. The NW UE-initiated Handover Capability is capability information indicating whether or not the network and/or the device in the network support the UE-initiated handover.

The UE-initiated Handover allowed is information indicating whether or not the UE-initiated handover is allowed. The UE-initiated Handover allowed may be information indicating whether or not the UE-initiated handover is allowed in the cell and/or tracking area and/or access network during connection, or information indicating whether or not the UE-initiated handover is temporarily allowed.

The NW-initiated Handover allowed is information indicating whether or not the network-initiated handover is allowed. The NW-initiated Handover allowed may be information indicating whether or not the network-initiated handover is allowed in the cell and/or tracking area and/or access network during connection, or information indicating whether or not the UE-initiated handover is temporarily allowed.

The configuration of each device will be described below.

1.2.1. Configuration of UE

Figure 4A:
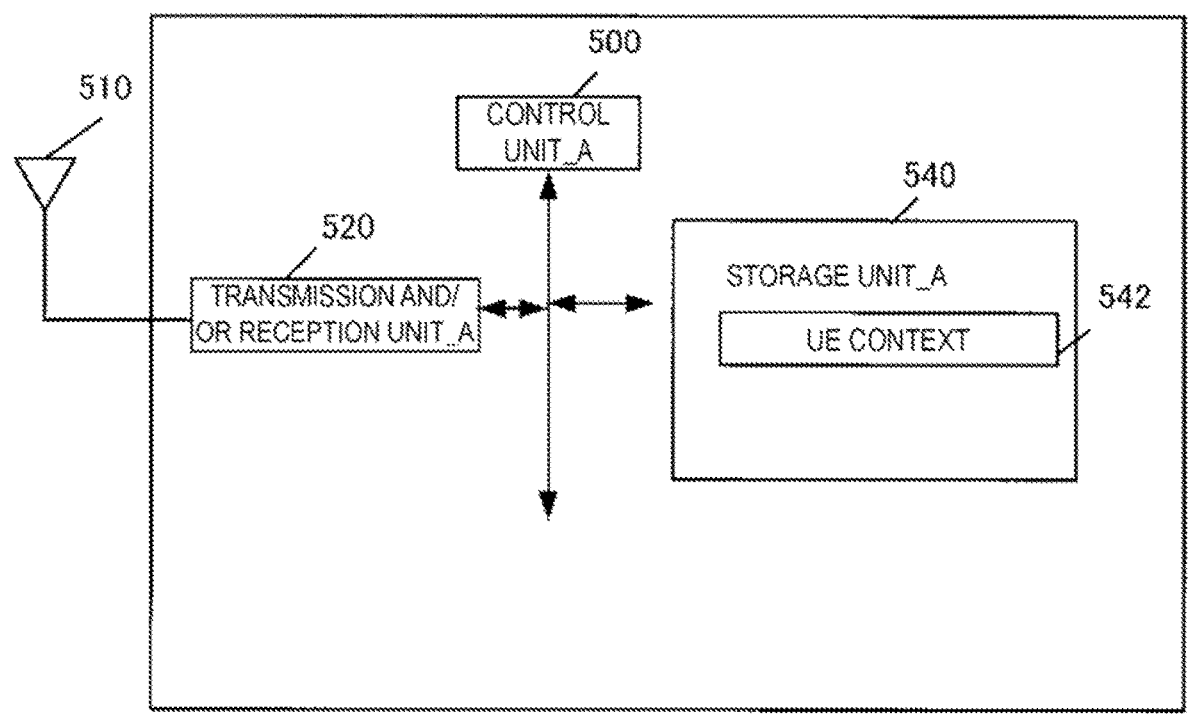
FIG. 4A is a diagram illustrating a device configuration of a UE.

FIG. 4A illustrates a device configuration of the UE_A 10. As illustrated in the figure, the UE_A 10 comprises a transmission and/or reception unit_A 420, a control unit_A 400, and a storage unit_A 440. The transmission and/or reception unit_A 420 and the storage unit_A 440 are connected to the control unit_A 400 via a bus.

The control unit_A 400 is a function unit for controlling the UE_A 10. The control unit_A 400 implements various processes by reading out various programs stored in the storage unit_A 440 and executing the programs.

The transmission and/or reception unit_A 420 is a function unit for the UE_A 10 to connect to the base station and/or the access point in the access network to connect to the access network. Furthermore, an external antenna_A 410 is connected to the transmission and/or reception unit_A 420. In other words, the transmission and/or reception unit_A 420 is a function unit for the UE_A 10 to connect to the base station in the access network and/or the access point. The transmission and/or reception unit_A 420 is a transmitting and/or receiving function unit for the UE_A 10 to transmit and/or receive the user data and/or the control information to and/or from the base station in the access network and/or the access point.

The storage unit_A 440 is a function unit for storing programs, data, and the like necessary for each operation of the UE_A 10. The storage unit_A 440 is constituted of, for example, a semiconductor memory, a Hard Disk Drive (HDD), or the like. The storage unit_A 440 may store at least identification information and/or control information and/or a flag and/or a parameter included in a control message which is transmitted and/or received in a communication procedure described later. As illustrated in the figure, the storage unit_A 440 stores a UE context 542. Hereinafter, information elements stored in the storage unit_A 440 will be described.

First, FIG. 5B illustrates information elements included in the UE context stored for each UE. As illustrated in the figure, the UE context stored for each UE includes IMSI, EMM State, GUTI, and ME Identity.

Further, the UE context stored for each UE may include Mobility Type and/or Handover Information.

Next, FIG. 5C illustrates the UE context for each Packet Data Unit (PDU) session stored for each PDU session. As illustrated in the figure, the UE context for each PDU session includes APN in Use (Data Network Identifier), Assigned Session Type (Assigned PDN Type), IP Address(es), and Default Bearer.

The UE context stored for each PDU session may include Mobility Type and/or Handover Information.

FIG. 5D illustrates the UE context for each bearer stored in the storage unit of the UE. As illustrated in the figure, the UE context for each bearer includes EPS Bearer ID, TI, and TFT.

1.2.2. Configuration of eNB/NextGen BS/WAG

Figure 6A:
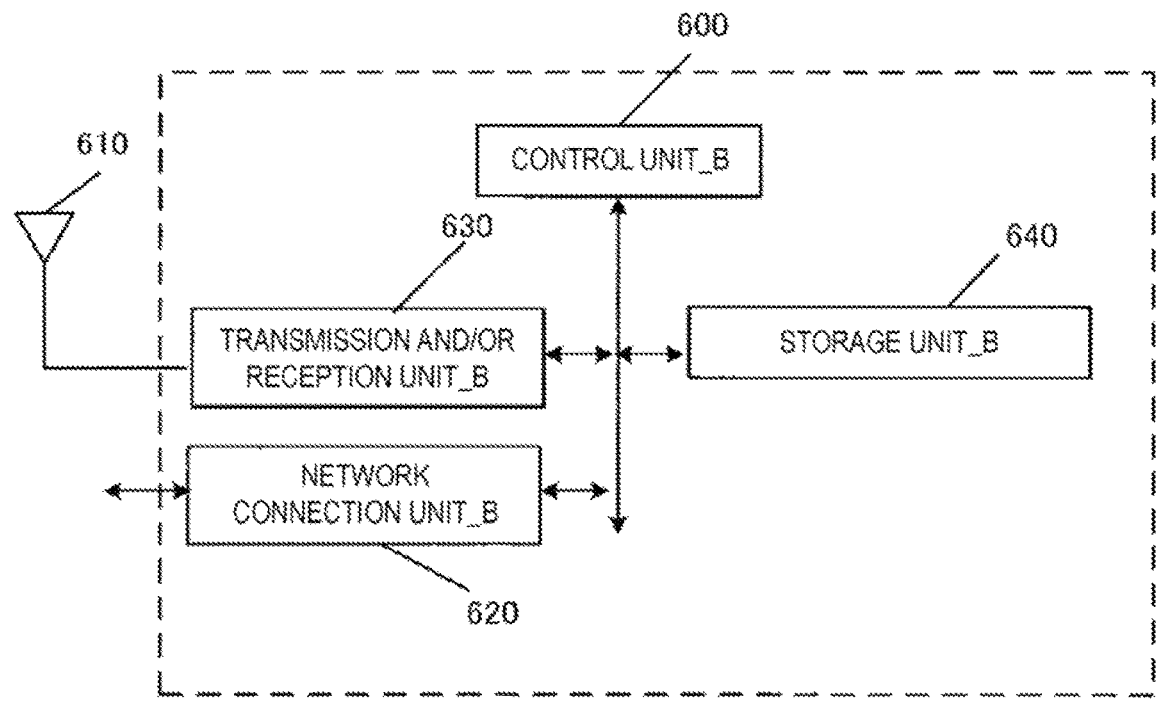
FIG. 6A is a diagram illustrating a device configuration of eNB/NextGen BS/WAG.

A configuration of the eNB_A 45, the NextGen BS_A 122, and the WAG_A 126 will be described. FIG. 6A illustrates a device configuration of the eNB_A 45, the NextGen BS_A 122, and the WAG_A 126. As illustrated in the figure, each of the eNB_A 45, the NextGen BS_A 122, and the WAG_A 126 comprises a network connection unit_B 620, a transmission and/or reception unit_B 630, a control unit_B 600, and a storage unit_B 640. The network connection unit_B 620, the transmission and/or reception unit_B 630, and the storage unit_B 640 are connected to the control unit_B 600 via a bus.

The control unit_B 600 is a function unit for controlling the eNB_A 45. The control unit_B 600 implements various processes by reading out and executing various programs stored in the storage unit_B 640.

The network connection unit_B 620 is a function unit for each of the eNB_A 45, the NextGen BS_A 122, and the WAG_A 126 to connect to the MME_A 40 and/or the SGW_A 35. The network connection unit_B 620 is a transmission and/or reception unit for each of the eNB_A 45, the NextGen BS_A 122, and the WAG_A 126 to transmit and/or receive the user data and/or control information to and/or from the MME_A 40 and/or the SGW_A 35.

The transmission and/or reception unit_B 630 is a function unit for each of the eNB_A 45, the NextGen BS_A 122, and the WAG_A 126 to connect to the UE_A 10. Furthermore, the transmission and/or reception unit_B 630 is a transmitting and/or receiving function unit for transmitting and/or receiving the user data and/or control information to and/or from the UE_A 10. Furthermore, an external antenna B 610 is connected to the transmission and/or reception unit_B 630.

The storage unit_B 640 is a function unit for storing programs, data, and the like necessary for each operation of the eNB_A 45, the NextGen BS_A 122, and the WAG_A 126. The storage unit_B 640 is constituted of, for example, a semiconductor memory, a Hard Disk Drive (HDD), or the like. The storage unit_B 640 may store at least identification information and/or control information and/or a flag and/or a parameter included in a control message which is transmitted and/or received in a communication procedure described later. The storage unit_B 640 may store these pieces of information as the UE contexts.

The storage unit_B 640 may further include Mobility Type and/or Handover Information.

1.2.3. Configuration of MME

Figure 7A:
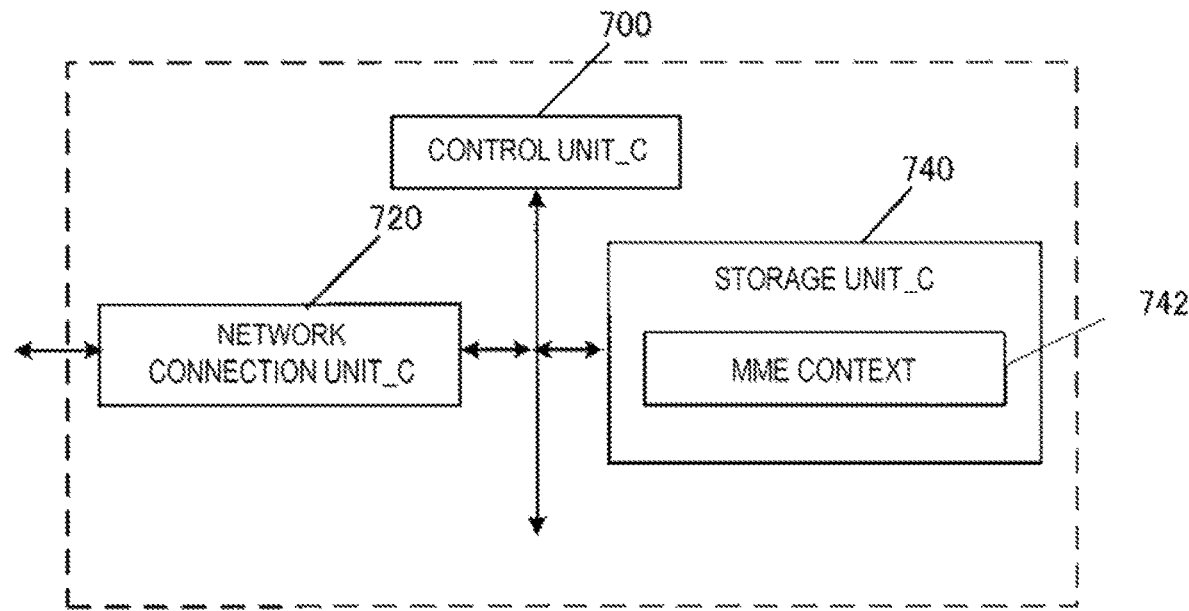
FIG. 7A is a diagram illustrating a device configuration of an MME.

A configuration of the MME_A 40 will be described below. FIG. 7A illustrates a device configuration of the MME_A 40. As illustrated in the figure, the MME_A 40 comprises a network connection unit_C 720, a control unit_C 700, and a storage unit_C 740. The network connection unit_C 720 and the storage unit_C 740 are connected to the control unit_C 700 via a bus.

The control unit_C 700 is a function unit for controlling the MME_A 40. The control unit_C 700 implements various processes by reading out and executing various programs stored in the storage unit_C 740.

The network connection unit_C 720 is a function unit for the MME_A 40 to connect to the base station and/or the access point in the access network in the access network and/or the SCEF_A 46 and/or the HSS_A 50 and/or the SGW_A 35. Moreover, the network connection unit_C 720 is a transmission and/or reception unit for the MME_A 40 to transmit and/or receive the user data and/or the control information to and/or the base station and/or the access point in the access network in the access network and/or the SCEF_A 46 and/or the HSS_A 50 and/or the SGW_A 35.

The storage unit_C 740 is a function unit for storing programs, data, and the like necessary for each operation of the MME_A 40. The storage unit_C 740 is constituted of, for example, a semiconductor memory, a Hard Disk Drive (HDD), or the like. The storage unit_C 740 may store at least identification information and/or control information and/or a flag and/or a parameter included in the control message transmitted and/or received in a communication procedure described.

As illustrated in the figure, the storage unit_C 740 stores a MME context 1142. Hereinafter, information elements stored in the storage unit_C 740 will be described. FIG. 8B illustrates information elements included in the UE context stored for each UE. As illustrated in the figure, the MME context stored for each UE includes IMSI, MSISDN, MM State, GUTI, ME Identity, UE Radio Access Capability, UE Network Capability, MS Network Capability, Access Restriction, MME F-TEID, SGW F-TEID, eNB Address, MME UE S1AP ID, cNB UE S1AP ID, NextGen BS Address, NextGen BS ID, WAG Address, and WAG ID.

The MME context stored for each UE may further include Mobility Type and/or Handover Information.

Next, FIG. 9C illustrates the MME context for each PDU session stored for each PDU session. As illustrated in the figure, the MME context for each PDU session includes APN in Use (Data Network Identifier), Assigned Session Type (Assigned PDN Type), IP Address, PGW F-TEID, SCEF ID, and Default bearer.

The MME context for each PDU session may further include Mobility Type and/or Handover Information.

FIG. 9D illustrates the MME context for each bearer stored for each bearer. As illustrated in the figure, the MME context stored for each bearer includes EPS Bearer ID, TI, TFT, SGW F-TEID, PGW F-TEID, MME F-TEID, eNB/ NextGen BS/WAG Address, and eNB/NextGen BS/WAG ID. Here, the information elements included in the MME context illustrated in FIGS. 8B to 9D may be included in either the MM context 644 or the EPS bearer context and stored.

1.2.4. Configuration of SGW

Figure 10A:
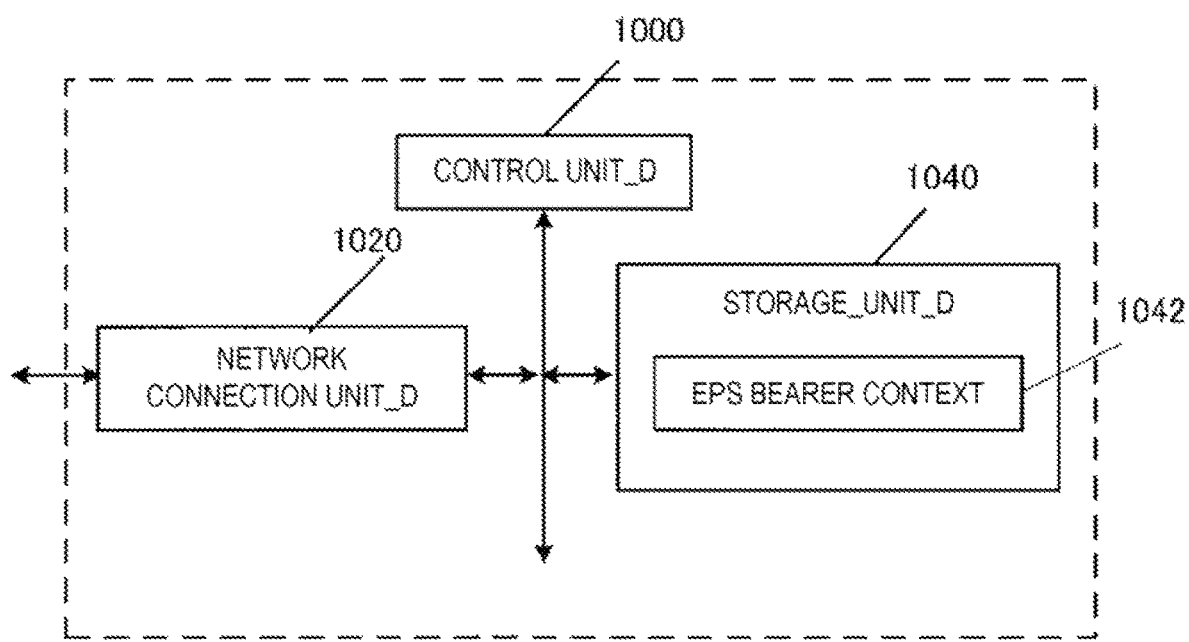
FIG. 10A is a diagram illustrating a device configuration of SGW/PGW/SCEF.

FIG. 10A illustrates a device configuration of the SGW_A 35. As illustrated in the figure, the SGW_A 35 comprises a network connection unit_D 1020, a control unit_D 1000, and a storage unit_D 1040. The network connection unit_D 1020 and the storage unit_D 1040 are connected to the control unit_D 1000 via a bus.

The control unit_D 1000 is a function unit for controlling the SGW_A 35. The control unit_D 1000 implements various processes by reading out and executing various programs stored in the storage unit_D 1040.

The network connection unit_D 1020 is a function unit for the SGW_A 35 to connect to the base station and/or the access point in the access network, and/or MME_A 40 and/or PGW_A 30 and/or SGSN_A 42. Moreover, the network connection unit_D 1020 is a transmission and/or reception unit for the SGW_A 35 to transmit and/or receive the user data and/or the control information to and/or from the base station and/or the access point in the access network, and/or the MME_A 40 and/or the PGW_A 30 and/or the SGSN_A 42.

The storage unit_D 1040 is a function unit for storing programs, data, and the like necessary for each operation of the SGW_A 35. The storage unit_D 1040 is constituted of, for example, a semiconductor memory, a Hard Disk Drive (HDD), or the like.

The storage unit_D 1040 may store at least identification information and/or control information and/or a flag and/or a parameter included in a control message which is transmitted and/or received in a communication procedure described later.

As illustrated in the figure, the storage unit_D 1040 stores an EPS bearer context 1442. Note that the EPS bearer context includes an EPS bearer context stored for each UE, an EPS bearer context stored for each PDU session, and an EPS bearer context stored for each bearer.

FIG. 11B illustrates information elements of the EPS bearer context stored for each UE. As illustrated in the figure, the EPS bearer context stored for each UE includes IMSI, ME Identity, MSISDN, MME F-TEID, and SGW F-TEID.

The EPS bearer context further includes an EPS bearer context for each PDU session stored for each PDU session. FIG. 11C illustrates the EPS bearer context for each PDU session. As illustrated in the figure, the EPS bearer context for each PDU session includes APN in Use (Data Network Identifier), Assigned Session Type (Assigned PDN Type), SGW F-TEID, PGW F-TEID, Default Bearer, and IP Address(es).

The EPS bearer context further includes an EPS bearer context for each bearer. FIG. 11D illustrates the EPS bearer context for each bearer. As illustrated in the figure, the EPS bearer context for each bearer includes EPS Bearer ID, TFT, PGW F-TEID, SGW F-TEID, eNB F-TEID, MME/NextGen BS/WAG Address, and MME/NextGen BS/WAG ID.

1.2.5. Configuration of PGW

FIG. 10A illustrates a device configuration of the PGW_A 30. As illustrated in the figure, the PGW_A 30 comprises a network connection unit_D 1020, a control unit_D 1000, and a storage unit_D 1040. The network connection unit_D 1020 and the storage unit_D 1040 are connected to the control unit_D 1000 via a bus.

The control unit_D 1000 is a function unit for controlling the PGW_A 30. The control unit_D 1000 implements various processes by reading out and executing various programs stored in the storage unit_D 1040.

The network connection unit_D 1020 is a function unit for the PGW_A 30 to connect to the SGW_A 35 and/or the PCRF_A 60 and/or the ePDG_A 65 and/or the AAA_A 55 and/or the TWAG_A 74 and/or the PDN_A 5. The network connection unit_D 1020 is a transmission and/or reception unit for the PGW_A 30 to transmit and/or receive the user data and/or the control information to and/or from the SGW_A 35 and/or the PCRF_A 60 and/or the ePDG_A 65 and/or the AAA_A 55 and/or the TWAG_A 74 and/or the PDN_A 5.

The storage unit_D 1040 is a function unit for storing programs, data, and the like necessary for each operation of the PGW_A 30. The storage unit_D 1040 is constituted of, for example, a semiconductor memory, a Hard Disk Drive (HDD), or the like.

The storage unit_D 1040 may store at least identification information and/or control information and/or a flag and/or a parameter included in a control message which is transmitted and/or received in a communication procedure described later.

As illustrated in the figure, the storage unit_D 1040 stores an EPS bearer context 1642. Note that the EPS bearer context includes an EPS bearer context stored for each UE, an EPS bearer context stored for each APN, an EPS bearer context stored for each PDU session, and an EPS bearer context stored for each bearer which may be separately stored in the EPS bearer context.

FIG. 12B illustrates information elements included in the EPS bearer context stored for each UE. As illustrated in the figure, the EPS bearer context stored for each UE includes IMSI, IMSI-unauthenticated-indicator, ME Identity, MSISDN, and RAT type.

Next, FIG. 12C illustrates the EPS bearer context stored for each APN. As illustrated in the figure, the EPS bearer context stored for each APN of the storage unit of the PGW includes APN in use. The EPS bearer context stored for each APN may be stored for each Data Network Identifier.

FIG. 12D illustrates the EPS bearer context for each PDU session stored for each PDU session. As illustrated in the figure, the EPS bearer context for each PDU session includes Assigned Session Type (Assigned PDN Type), IP Address, SGW F-TEID, PGW F-TEID, and Default Bearer.

Furthermore, FIG. 12E illustrates the EPS bearer context stored for each EPS bearer. As illustrated in the figure, the EPS bearer context includes EPS Bearer ID, TFT, PGW F-TEID, and SGW F-TEID.

1.2.6. Configuration of SCEF

FIG. 10A illustrates a device configuration of the SCEF_A 46. As illustrated in the figure, the SCEF_A 46 comprises a network connection unit_D 1020, a control unit_D 1000, and a storage unit_D 1040. The network connection unit_D 1020 and the storage unit_D 1040 are connected to the control unit_D 1000 via a bus.

The control unit_D 1000 is a function unit for controlling the SCEF_A 46. The control unit_D 1000 implements various processes by reading out and executing various programs stored in the storage unit_D 1040. The network connection unit_D 1020 is a function unit for the SCEF_A 46 to connect to the core network_A 90. In other words, the network connection unit_D 1020 is a function unit for the SCEF_A 46 to connect to the MME_A 40. The network connection unit_D 1020 is a transmission and/or reception unit for the SCEF_A 46 to transmit and/or receive the user data and/or the control information to and/or from the MME_A 40.

The storage unit_D 1040 is a function unit for storing programs, data, and the like necessary for each operation of the SCEF_A 46. The storage unit_D 1040 is constituted of, for example, a semiconductor memory, a Hard Disk Drive (HDD), or the like. The storage unit_D 1040 may store at least identification information and/or control information and/or a flag and/or a parameter included in a control message which is transmitted and/or received in a communication procedure described later.

As illustrated in the figure, the storage unit_D 1040 stores an EPS bearer context 1042. Hereinafter, information elements stored in the storage unit_D 1040 will be described. FIG. 13B illustrates information elements included in the EPS bearer context. As illustrated in the figure, the EPS bearer context includes User Identity, APN in Use (Data Network Identifier), EPS Bearer ID, and Serving Node Information.

1.3. Description of Communication Procedure

Figure 15:
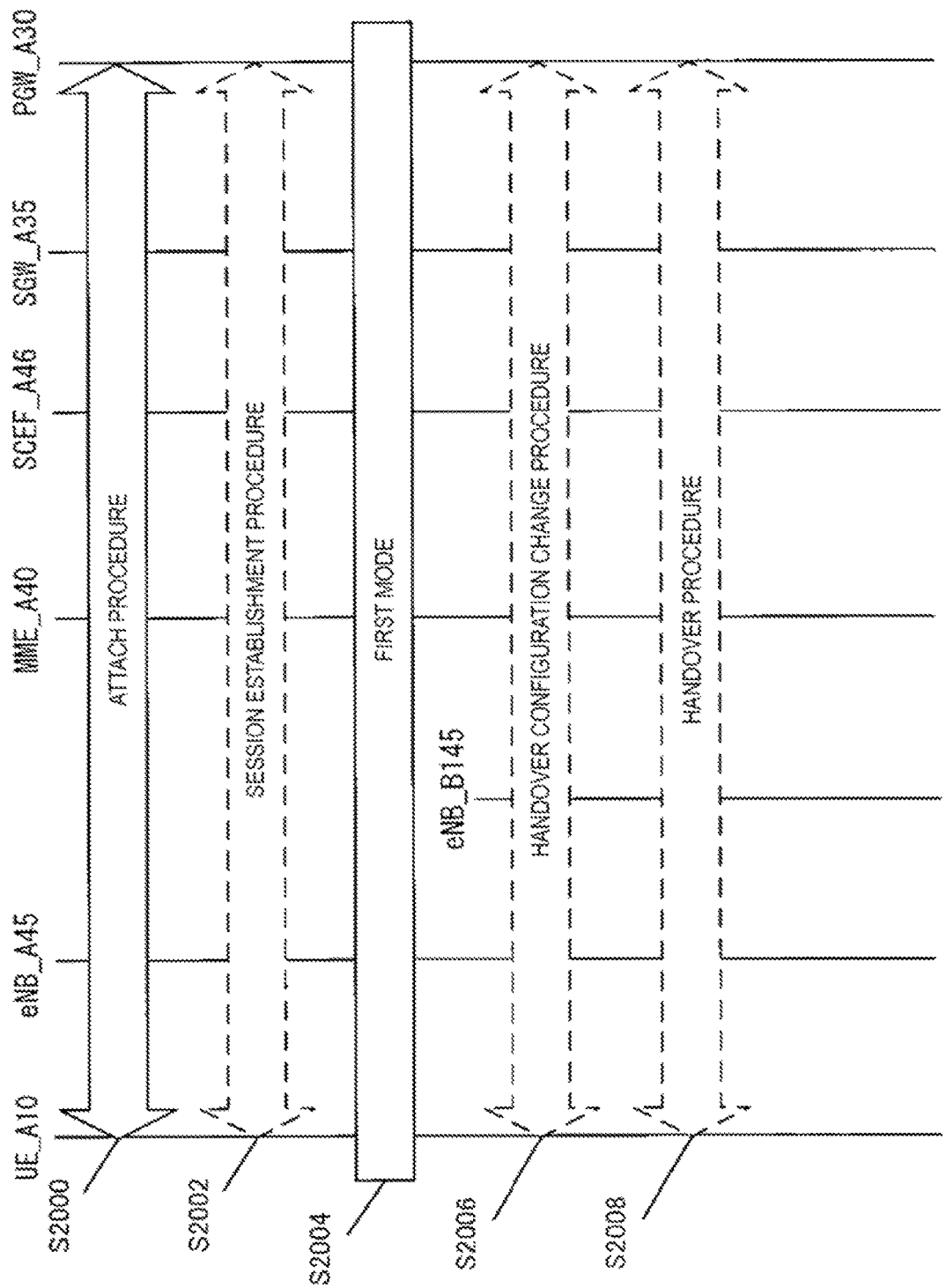
FIG. 15 is a diagram illustrating an overview of a communication procedure.

Next, a communication procedure according to the present embodiment will be described with reference to FIG. 15. Here, before describing the detailed steps of each procedure, in order to avoid redundant descriptions, terminology specific to the present embodiment and primary identification information used in each procedure will be described beforehand.

Figure 14:
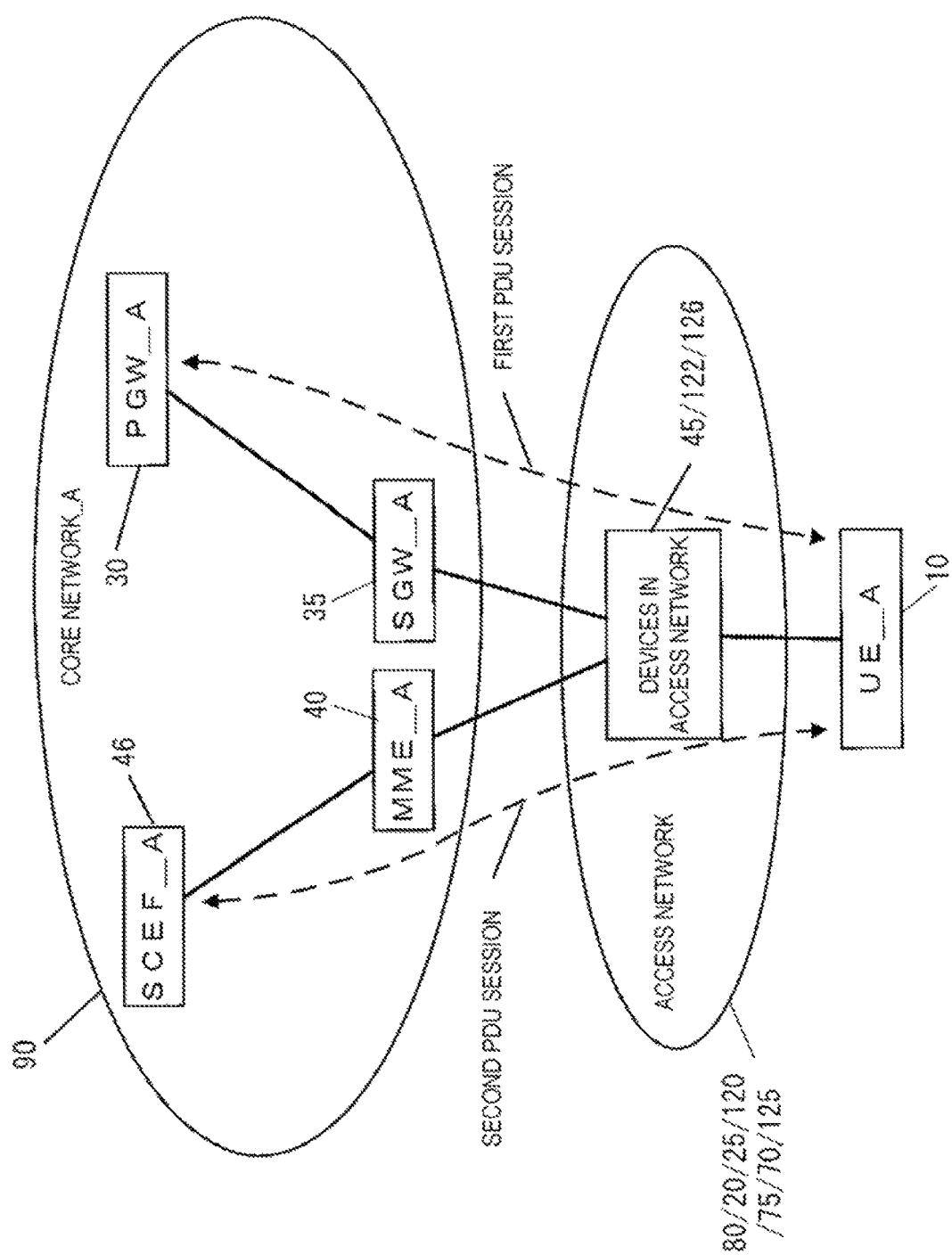
FIG. 14 is a diagram illustrating a state where a PDU session is established.

A first state in the present embodiment will be described with reference to FIG. 14. The first state in the present embodiment is a state in which the UE_A 10 is connected and registered to and in the core network_A 90, and each device establishes a PDU session. In each device, a procedure for registering the UE_A 10 in the core network_A 90 and a procedure for PDU session establishment may be simultaneously or separately performed.

Next, the identification information in the present embodiment will be described. First identification information in the present embodiment is capability information of the UE_A 10 indicating that the UE_A 10 has a function to perform the UE-initiated handover. Here, the function for the UE_A 10 to perform the UE-initiated handover may be a function that the terminal apparatus such as the UE_A 10 initiates the handover procedure. In other words, this function may be a function for the UE_A 10 to request a handover to the access network and/or the core network_A 90. To be more specific, this function may be a function for the UE_A 10 to request a handover to the base station apparatus located in the access network and/or the C-Plane control apparatus located in the core network_A 90.

Further in other words, this function may be a function for the UE_A 10 to request the access network and/or the core network_A 90 to start the UE-initiated handover procedure. To be more specific, this function may be a function for the UE_A 10 to request the base station apparatus located in the access network and/or the C-Plane control apparatus located in the core network_A 90 to start the UE-initiated handover procedure.

The first identification information may be information indicating that the UE_A 10 has a mobility-on-demand function corresponding to the function described above. Alternatively, the first identification information may be information indicating a mobility level and/or mobility type corresponding to the function described above.

Second identification information in the present embodiment is capability information of the network indicating that the network has a function to perform the UE-initiated handover. Here, the function for the network to perform the UE-initiated handover may be a function that the terminal apparatus such as the UE_A 10 initiates the handover procedure to start. In other words, this function may be a function to receive a request for handover transmitted by the UE_A 10 to perform the handover procedure. Note that the network may be the access network and/or the core network_A 90.

Further in other words, this function may be a function to receive a request to start the UE-initiated handover procedure, the request being transmitted to the access network and/or the core network_A 90 by the UE_A 10, to perform the handover procedure.

The second identification information may be information indicating that the UE_A 10 has a mobility-on-demand function corresponding to the function described above. Alternatively, the second identification information may be information indicating the mobility level and/or mobility type corresponding to the function described above.

Third identification information in the present embodiment is identification information indicating that the function to perform the UE-initiated handover is requested to be enabled. Here, enabling of the function to perform the UE-initiated handover may be that the UE_A 10 and/or the network changes its state to a state capable of performing the UE-initiated handover. The state where the UE_A 10 is capable of performing the UE-initiated handover may be a state where the terminal apparatus such as the UE_A 10 can initiate the handover procedure to start. In other words, this state may be a state where the UE_A 10 is capable of requesting a handover to the access network and/or the core network_A 90. To be more specific, this state may be a state where the UE_A 10 is capable of requesting a handover to the base station apparatus located in the access network and/or the C-Plane control apparatus located in the core network_A 90.

Further in other words, this state may be a state where the UE_A 10 is capable of requesting the access network and/or the core network_A 90 to start the UE-initiated handover procedure. To be more specific, this state may be a state where the UE_A 10 is capable of requesting the base station apparatus located in the access network and/or the C-Plane control apparatus located in the core network_A 90 to start the UE-initiated handover procedure.

The state where the network is capable of performing the UE-initiated handover may be a state where the terminal apparatus such as the UE_A 10 is capable of initiating the handover procedure to start. In other words, this state may be a state capable of receiving a request for handover transmitted by the UE_A 10 to perform the handover procedure. Note that the network may be the access network and/or the core network_A 90.

Further in other words, this state may be a state capable of receiving a request to start the UE-initiated handover procedure, the request being transmitted to the access network and/or the core network_A 90 by the UE_A 10, to perform the handover procedure.

The third identification information may be information requesting a mobility-on-demand function corresponding to the state described above to be enabled. Alternatively, the third identification information may be information indicating a request for transition to a mobility level and/or mobility type corresponding to the state described above.

Fourth identification information in the present embodiment is information indicating that the request indicated by the third identification information is allowed.

Fifth identification information in the present embodiment is capability information of the network indicating that the network does not have a function to perform the UE-initiated handover. Here, the function for the network to perform the UE-initiated handover may be a function that the terminal apparatus such as the UE_A 10 initiates the handover procedure to perform. In other words, this function may be a function to receive a request for handover transmitted by the UE_A 10 to perform the handover procedure. Note that the network may be the access network and/or the core network_A 90.

Further in other words, this function may be a function to receive a request to start the UE-initiated handover procedure, the request being transmitted to the access network and/or the core network_A 90 by the UE_A 10, to perform the handover procedure.

The fifth identification information may be information indicating that the UE_A 10 does not have a mobility-on-demand function corresponding to the function described above. Alternatively, the fifth identification information may be information indicating a mobility level and/or mobility type indicating that the function described above is not included.

And/or, the fifth identification information in the present embodiment may be information indicating that the request indicated by the third identification information is not allowed. The fifth identification information may be reason information (Cause Value) indicating the described meanings.

Sixth identification information in the present embodiment is capability information of the UE_A 10 indicating that the UE_A 10 requests to perform the UE-initiated handover. Here, the UE_A 10 requesting to perform the UE-initiated handover may be that the terminal apparatus such as the UE_A 10 initiates the handover procedure to start. In other words, this request may be that the UE_A 10 starts a handover to the access network and/or the core network_A 90. To be more specific, this request may be that the UE_A 10 starts a handover to the base station apparatus located in the access network and/or the C-Plane control apparatus located in the core network_A 90.

Alternatively, the sixth identification information may be information indicating that the handover procedure started by the UE_A 10 to the access network and/or the core network_A 90 is the UE-initiated handover procedure.

Alternatively, the sixth identification information may indicate that the UE_A 10 requests the access network and/or to core network_A 90 to start the network-initiated handover procedure. To be more specific, the information may be information indicating that the UE_A 10 requests the base station apparatus located in the access network and/or the C-Plane control apparatus located in the core network_A 90 to start a handover procedure initiated by the base station apparatus or C-Plane control apparatus.

Seventh identification information in the present embodiment is identification information indicating that the function to perform the UE-initiated handover is requested to be disabled. Here, disabling of the function to perform the UE-initiated handover may be that the UE_A 10 and/or the network change its state to a state not allowing the UE-initiated handover to be performed. The state where the UE_A 10 does not allow the UE-initiated handover to be performed may be a state where the terminal apparatus such as the UE_A 10 is incapable of initiating the handover procedure to start. In other words, this state may be a state where the UE_A 10 is incapable of requesting a handover to the access network and/or the core network_A 90. To be more specific, this state may be a state where the UE_A 10 is incapable of requesting a handover to the base station apparatus located in the access network and/or the C-Plane control apparatus located in the core network_A 90.

Further in other words, this state may be a state where the UE_A 10 is incapable of requesting the access network and/or the core network_A 90 to start the UE-initiated handover procedure. To be more specific, this state may be a state where the UE_A 10 is incapable of requesting the base station apparatus located in the access network and/or the C-Plane control apparatus located in the core network_A 90 to start the UE-initiated handover procedure.

The state where the network does not allow the UE-initiated handover to be performed may be a state not allowing the terminal apparatus such as the UE_A 10 to initiate the handover procedure to start. In other words, this state may be a state not receiving a request for handover transmitted by the UE_A 10. Alternatively, this state may be a state receiving a request for handover transmitted by the UE_A 10 and not performing the handover procedure based on the received request. Alternatively, in this state, the network may receive a request for handover transmitted by the UE_A 10 to transmit control information indicating that the request is not allowed based on the received request to the UE_A 10. Note that the network may be the access network and/or the core network_A 90.

The seventh identification information may be information requesting a mobility-on-demand function corresponding to the state described above to be enabled. Alternatively, the seventh identification information may be information indicating a request for transition to a mobility level and/or mobility type corresponding to the state described above. The seventh identification information may be information indicating a temporary transition to the state described above.

Eighth identification information in the present embodiment is information indicating that the request indicated by the seventh identification information is allowed.

Ninth identification information in the present embodiment is identification information indicating that the function to perform the network-initiated handover is requested to be disabled. Here, disabling of the function to perform the network-initiated handover may be that the network changes its state to a state not allowing the network-initiated handover to be performed. Note that the network may be the access network and/or the core network_A 90.

In other words, this state may be a state where the access network and/or the core network_A 90 are incapable of starting the handover procedure initiated and started by the access network and/or the core network_A 90. To be more specific, this function may be a state where the base station apparatus located in the access network and/or the C-Plane control apparatus located in the core network_A 90 are incapable of initiating the handover procedure to start.

The ninth identification information may be information requesting a mobility-on-demand function corresponding to the state described above to be enabled. Alternatively, the ninth identification information may be information indicating a request for transition to a mobility level and/or mobility type corresponding to the state described above.

The ninth identification information may be information indicating a temporary transition to the state described above.

Tenth identification information in the present embodiment is information indicating that the request indicated by the ninth identification information is allowed.

Eleventh identification information in the present embodiment may be information indicating that the request indicated by the ninth identification information is not allowed. The eleventh identification information may be reason information (Cause Value) indicating the described meanings.

Next, a communication procedure according to the present embodiment will be described with reference to FIG. 15. Details for each procedure are described later. Each device first performs an attach procedure (S2000) to change its state to a state where the UE_A 10 is connected to the network. Next, each device performs a PDU session establishment procedure (S2002) to change its state to the first state. Note that each device may exchange, with other devices, various pieces of capability information and/or various pieces of request information of each device in the attach procedure and/or the PDU session establishment procedure.

In a case that each device carries out exchange of various pieces of information and/or negotiation of various requests in the attach procedure, each device may not carry out the exchange of various pieces of information and/or the negotiation of various requests in the PDU session establishment procedure. In contrast, in a case that each device does not carry out the exchange of various pieces of information and/or the negotiation of various requests in the attach procedure, each device may carry out the exchange of various pieces of information and/or the negotiation of various requests in the PDU session establishment procedure. The present embodiment is not limited to these, even in a case each device carries out the exchange of various pieces of information and/or the negotiation of various requests in the attach procedure, each device may carry out the exchange of various pieces of information and/or the negotiation of various requests in the PDU session establishment procedure.

For example, each device may exchange one or more pieces of identification information among the first to eleventh identification information in the attach procedure and the PDU session establishment procedure. Each device may exchange one or more pieces of identification information among the first to eleventh identification information in the attach procedure, and may not exchange in the PDU session establishment procedure. In contrast, each device may not exchange one or more pieces of identification information among the first to eleventh identification information in the attach procedure, but may exchange in the PDU session establishment procedure. Each device may exchange, in the PDU session establishment procedure, the identification information which is not exchanged in the attach procedure among the first to eleventh identification information.

Furthermore, each device may these pieces of identification information during the attach procedure in a case of managing the identification information in association with the UE_A 10, and may exchange during the PDU session establishment procedure in a case of managing in association with the PDU session.

Each device may perform the PDU session establishment procedure during the attach procedure, or after completing the attach procedure. In a case that the PDU session establishment procedure is performed during the attach procedure, each device may establish the PDU session or change its state to the first state, based on the completion of the attach procedure.

Next, each device performs a handover configuration change procedure (S2006) and/or a handover procedure (S2008). The handover configuration change procedure (S2006) and/or the handover procedure (S2008) may be performed at any timing so long as it is after the transition to the first state. Each device may exchange various pieces of request information in the handover configuration change procedure and/or in the handover procedure.

For example, each device may exchange information for temporarily prohibiting the UE_A 10-initiated and/or network-initiated handover in the handover configuration change procedure. Each device may exchange information for performing the UE_A 10-initiated handover in the handover procedure.

According to the above procedure, each device completes the procedure. Each device relating to the procedure may transmit and/or receive each control message described in this procedure to transmit and/or receive one or multiple pieces of identification information included in each control message, and store each piece of the transmitted and/or received identification information as a context.

1.3.1. Overview of Attach Procedure

First, an overview of the attach procedure will be described. This procedure is a procedure initiated by the UE_A 10 to connect to the network (the access network and/or the core network_A 90 and/or the PDN_A 5). The UE_A 10, in a case of a state not connecting to the core network_A 90, can perform this procedure at any timing, for example, at the timing when the terminal is powered on. In other words, the UE_A 10, in a case of the deregistered state (EMM-DEREGISTERED), may start this procedure at any timing. Each device may change its state to the registered state (EMM-REGISTERED), based on the completion of the attach procedure.

1.3.2. Example of PDU Session Establishment Procedure

Next, an example of the PDU session establishment procedure will be described. This procedure is a procedure for each device to establish a PDU session. Each device may perform this procedure in the state where the attach procedure is completed, or during the attach procedure. Each device may start this procedure at any timing after the attach procedure. Each device may establish the PDU session, based on the completion of the PDU session establishment procedure. Furthermore, each device may establish multiple PDU sessions by performing this procedure multiple times.

This procedure may be initiated by the UE_A 10 to be performed, or initiated by the network to be performed. For example, the UE_A 10 may initiate and perform this procedure at an initial connection, for example, at the timing when the terminal is powered on. The network may initiate this procedure to perform at the time of receiving the user data and/or control message from the DN or updating an operator policy.

1.3.2.1. Example of UE-Initiated PDU Session Establishment Procedure

Figure 17:
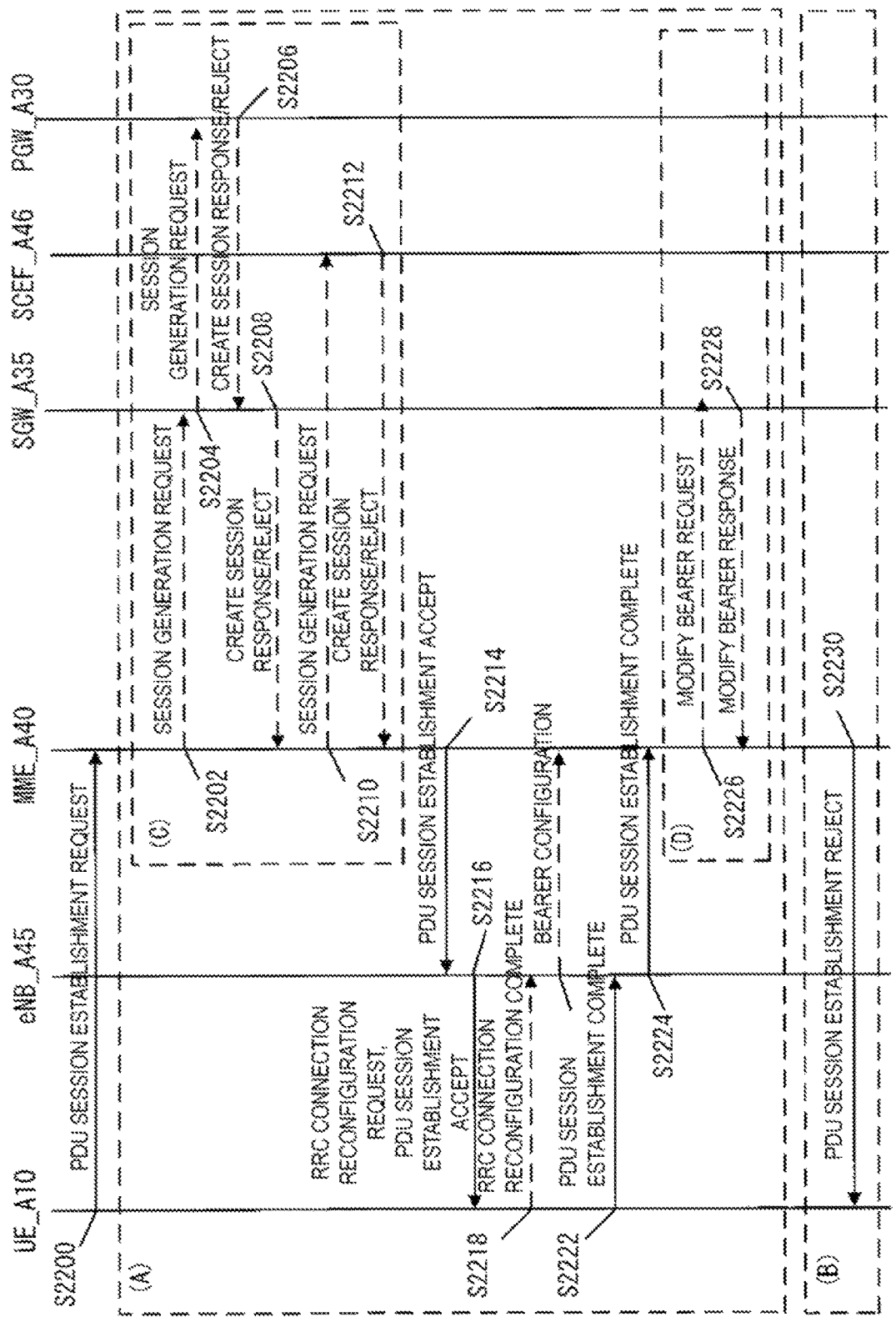
FIG. 17 a diagram illustrating a UE-initiated PDU session establishment procedure.

A description is given of an example of steps that the UE_A 10 initiates and performs the PDU session establishment procedure with reference to FIG. 17. Hereinafter, steps of this procedure will be described. First, the UE_A 10 transmits a PDU session establishment request message via the eNB_A 45 to the MME_A 40 to start a UE-initiated PDU session establishment procedure (S2200).

Here, the UE_A 10 may include at least the first identification information and/or the third identification information in the PDU session establishment request message, or include these pieces of identification information to request a PDU session to be established with the UE-initiated handover being supported. The UE_A 10 may include the first identification information and/or the third identification information in the PDU session establishment request message to indicate that the UE_A 10 has the function to perform the UE-initiated handover and/or the mobility-on-demand function corresponding to the UE-initiated handover, or indicate the mobility level corresponding to the UE-initiated handover.

The UE_A 10 may include the first identification information and/or the third identification information in the PDU session establishment request message to request to enable the function to perform the UE-initiated handover, or request to transit to the state capable of performing the UE-initiated handover. The UE_A 10 may request to enable the mobility-on-demand function corresponding to the UE-initiated handover, or request to transit to the mobility level corresponding to the UE-initiated handover.

The UE_A 10 may include at least the ninth identification information in the PDU session establishment request message, or include the identification information to request to temporarily prohibit and/or not perform the network-initiated handover. The UE_A 10 may include the ninth identification information in the PDU session establishment request message to request to temporarily disable the function to perform the network-initiated handover, or request to temporarily change its state to the state not allowing the network-initiated handover to be performed.

The UE_A 10 may include the ninth identification information in the PDU session establishment request message to request to enable the mobility-on-demand function corresponding to the state not allowing the network-initiated handover to be performed, or request to transit to the mobility level corresponding to this state.

The MME_A 40 receives the PDU session establishment request message to determine a first condition. The MME_A 40 starts a procedure (A) in this procedure, in a case that the first condition is true, or starts a procedure (B) in this procedure, in a case that the first condition is false.

Hereinafter, steps of the procedure (A) in this procedure, will be described. The MME_A 40 performs a procedure (C) in this procedure to start the procedure (A), in this procedure. Steps of the procedure (C) in this procedure, will be described. The MME_A 40 performs a determination on a second condition to start the procedure (C) in this procedure. In a case that the second condition is true, the MME_A 40 may transmit a create session request message to the SGW_A 35 (S2202). On the other hand, in a case that the second condition is false, the MME_A 40 may transmit a create session request message to the SCEF_A 46 (S2210). A step in the case that the first condition is false is described later.

Here, the determination on the first condition is for the MME_A 40 to determine whether to accept the request from the UE_A 10. The case that the first condition is true is a case that the request from the UE_A 10 is accepted and may be a case that the request from the UE_A 10 is allowed. The case that the first condition is false is a case that the request from the UE_A 10 is rejected and may be a case that the first condition is not determined to be true.

The determination on the second condition is for the MME_A 40 to determine a type of the PDU session to be established. The case that the second condition is true is a case that the PDU session to be established is a first type of PDU session and may be a case that the UE_A 10 requests the first type of PDU session to be established, and the MME_A 40 allows the request and/or the MME_A 40 determines to establish the first type of PDU session. The case that the second condition is false is a case that the PDU session to be established is a second type of PDU session and may be a case that the UE_A 10 requests the second type of PDU session to be established, and the MME_A 40 allows the request and/or the MME_A 40 determines to establish the second type of PDU session, and may be a case that the second condition is not determined to be true.

Here, the first type of PDU session is connectivity between the UE_A 10 and the DN via the eNB_A 45 and/or the SGW_A 35 and/or the PGW_A 30, and the second type of PDU session is connectivity between the UE_A 10 and the DN via the eNB_A 45 and/or the MME_A 40 and/or the SCEF_A 46.

In a case that the SGW_A 35 receives the create session request message, the SGW_A 35 transmits the create session request message to the PGW_A 30 (S2204). Furthermore, the PGW_A 30 receives the create session request message to determine a third condition.

In a case that the third condition is true, the PGW_A 30 transmits a create session response message to the SGW_A 35 (S2206). The SGW_A 35 receives the create session response message and transmits the create session response message to the MME_A 40 (S2208). The MME_A 40 receives the create session response message.

In a case that the third condition is false, the PGW_A 30 transmits a create session reject message to the SGW_A 35 (S2206). The SGW_A 35 receives the create session reject message and transmits the create session reject message to the MME_A 40 (S2208). The create session reject message may be a create session response message including a reject reason.

In a case that the SCEF_A 46 receives the create session request message, the SCEF_A 46 determines the third condition. In a case that the third condition is true, the SCEF_A 46 transmits the create session response message to the MME_A 40 (S2212). The MME_A 40 receives the create session response message. The SCEF_A 46 transmits the create session reject message to the MME_A 40 (S2212). Each device completes the procedure (C) in this procedure, based on the reception of the create session response message and/or create session reject message.

The determination on the third condition is for the PGW_A 30 and/or the SCEF_A 46 to determine whether to accept the request from the UE_A 10. The case that the third condition is true is a case that the request from the UE_A 10 is accepted and may be a case that the request from the UE_A 10 is allowed. The case that the third condition is false is a case that the request from the UE_A 10 is rejected, and may be a case that the third condition is not determined to be true and may be a case that the third condition is not determined to be true.

The MME_A 40 transmits a PDU session establishment accept message to the eNB_A 45, based on the reception of the create session response message (S2214). In a case that the MME_A 40 receives the create session reject message, the MME_A 40 may not continue the procedure (A) in this procedure, to start the procedure (B), in this procedure.

The eNB_A 45 receives the PDU session establishment accept message and transmits an RRC connection reconfiguration request message and/or the PDU session establishment accept message to the UE_A 10 (S2216). The PDU session establishment accept message may be transmitted and/or received while being included in the RRC connection reconfiguration request message.

Here, the MME_A 40 may include at least the second identification information and/or the fourth identification information in the PDU session establishment accept message, or include these pieces of identification information to indicate that the request from the UE_A 10 is allowed or that the PDU session with the UE-initiated handover being supported is established. The MME_A 40 may include the second identification information and/or the fourth identification information in the PDU session establishment accept message to indicate that the MME_A 40 has the function to perform the UE-initiated handover and/or the mobility-on-demand function corresponding to the UE-initiated handover, or indicate the mobility level corresponding to the UE-initiated handover.

The MME_A 40 may include the second identification information and/or the fourth identification information in the PDU session establishment accept message to indicate that the enabling of the function to perform the UE-initiated handover is allowed, or indicate that the change its state to the state capable of performing the UE-initiated handover is allowed. The MME_A 40 may further indicate that the enabling of the mobility-on-demand function corresponding to the UE-initiated handover is allowed, or indicate that the transit to the mobility level corresponding to the UE-initiated handover is allowed.

The MME_A 40 and/or the eNB_A 45 may include at least the seventh identification information in the PDU session establishment accept message, or may include the seventh identification information to request to temporarily prohibit the UE-initiated handover procedure. The MME_A 40 and/or the eNB_A 45 may include the seventh identification information in the PDU session establishment accept message to request to temporarily disable the function to perform the UE-initiated handover, or request to temporarily change its state to the state not allowing the UE-initiated handover to be performed.

The MME_A 40 and/or the eNB_A 45 may include the seventh identification information in the PDU session establishment accept message to request to enable the mobility-on-demand function corresponding to the state not allowing the UE-initiated handover to be performed, or request to transit to the mobility level corresponding to this state.

The MME_A 40 may include at least the tenth identification information in the PDU session establishment accept message, or may include the identification information to indicate that the request to temporarily prohibit the network-initiated handover procedure is allowed. The MME_A 40 may include the tenth identification information in the PDU session establishment accept message to indicate that the temporarily disabling of the function to perform the network-initiated handover is allowed, or that the temporary transition to the state not allowing the network-initiated handover to be performed is allowed.

The MME_A 40 may include the tenth identification information in the PDU session establishment accept message to indicate that the enabling of the mobility-on-demand function corresponding to the state not allowing the network-initiated handover to be performed is allowed, or indicate that the transition to the mobility level corresponding to this state is allowed.

In a case that UE_A 10 receives the RRC connection reconfiguration request message, the UE_A 10 transmits the RRC connection reconfiguration request message to the eNB_A 45 (S2218). The eNB_A 45 receives the RRC connection reconfiguration request message and transmits a bearer setup message to the MME_A 40 (S2220). The MME_A 40 receives the bearer setup message.

In a case that the UE_A 10 receives the PDU session establishment accept message, the UE_A 10 transmits a PDU session establishment complete message to the MME_A 40 via the eNB_A 45 (S2222) (S2224). The MME_A 40 receives the PDU session establishment complete message and starts a procedure (D) in this procedure.

Hereinafter, steps of the procedure (D) in this procedure, will be described. In the case that the second condition is true, the MME_A 40 transmits a modify bearer request message to the SGW_A 35 and starts the procedure (D) in this procedure (S2226). The SGW_A 35 receives the modify bearer request message and transmits a modify bearer response message to the MME_A 40 (S2228). The MME_A 40 receives the modify bearer response message and completes the procedure (D) in this procedure. Each device completes the procedure (A) in this procedure, based on the transmission and/or reception of the PDU session establishment complete message and/or the completion of the procedure (D) in this procedure.

The UE_A 10 may include at least the eighth identification information in the PDU session establishment complete message, or may include the eighth identification information to indicate that the request to temporarily prohibit the UE-initiated handover procedure is allowed. The UE_A 10 may include the eighth identification information in the PDU session establishment complete message to indicate that the temporarily disabling of the function to perform the UE-initiated handover is allowed, or indicate that the temporary transition to the state not allowing the UE-initiated handover to be performed is allowed.

The UE_A 10 may include the eighth identification information in the PDU session establishment complete message to indicate that the enabling of the mobility-on-demand function corresponding to the state not allowing the UE-initiated handover to be performed is allowed, or indicate that the transition to the mobility level corresponding to this state is allowed.

Next, steps of the procedure (B) in this procedure, will be described. The MME_A 40 transmits a PDU session establishment reject message to the UE_A 10 via the eNB_A 45 and starts the procedure (B) in this procedure (S2230). The UE_A 10 receives the PDU session establishment reject message to confirm that the request from the UE_A 10 is rejected. Each device completes the procedure (B) in this procedure, based on the transmission and/or reception of the attach reject message.

Here, the MME_A 40 may include at least the fifth identification information in the PDU session establishment reject message, or include the identification information to indicate that the request from the UE_A 10 is not allowed or that the PDU session with the UE-initiated handover being supported is not established. The MME_A 40 may include the fifth identification information in the PDU session establishment reject message to indicate that the MME_A 40 does not have the function to perform the UE-initiated handover and/or the mobility-on-demand function corresponding to the UE-initiated handover, or indicate the mobility level not having the UE-initiated handover function.

The MME_A 40 may include at least the eleventh identification information in the PDU session establishment reject message, or may include the identification information to indicate that the request from the UE_A 10 is not allowed. The MME_A 40 may include the eleventh identification information in the PDU session establishment reject message to indicate that the temporarily prohibiting of the network-initiated handover is not allowed, or indicate that the transition to the state not allowing the network-initiated handover to be performed is not allowed.

The MME_A 40 may include the eleventh identification information in the PDU session establishment reject message to indicate that the enabling of the mobility-on-demand function corresponding to the state not allowing the network-initiated handover to be performed is not allowed, or indicate that the transition to the mobility level corresponding to this state is not allowed.

Each device completes this procedure based on the completion of the procedure (A) or (B) in this procedure. Each device may change its state to a state where the PDU session is established, based on the completion of the procedure (A) in this procedure, or may confirm that this procedure is rejected based on the completion of the procedure (B) in this procedure.

Each device may establish the PDU session with the UE-initiated handover being supported, based on the completion of this procedure. In other words, each device may establish the PDU session with the UE-initiated handover being supported in the case of transmitting or receiving the second identification information and/or the fourth identification information, or may not establish in the case of transmitting and/or receiving the fifth identification information.

In the case of transmitting and/or receiving the second identification information and/or the fourth identification information, each device may enable the function to perform the UE-initiated handover, or may change its state to the state capable of performing the UE-initiated handover. Each device may enable the mobility-on-demand function corresponding to the UE-initiated handover, or may change its state to the mobility level corresponding to the UE-initiated handover.

In the case of transmitting and/or receiving the fifth identification information, each device may disable the function to perform the UE-initiated handover, or may change its state to the state incapable of performing the UE-initiated handover. Each device may disable the mobility-on-demand function corresponding to the UE-initiated handover, or may change to the mobility level not having the UE-initiated handover function.

In the case of transmitting and/or receiving the eighth identification information, each device may temporarily prohibit the UE-initiated handover procedure, change its state to a state temporarily not allowing the UE-initiated handover, or change to the mobility level corresponding to this state, based on the completion of this procedure. Each device may confirm that the function to perform the UE-initiated handover is temporarily disabled, or confirm that the mobility-on-demand function corresponding to the state not allowing the UE-initiated handover to be performed is enabled, based on the completion of this procedure.

In the case of transmitting and/or receiving the tenth identification information, each device may temporarily prohibit the network-initiated handover procedure, change its state to a state temporarily not allowing the network-initiated handover, or change to the mobility level corresponding to this state, based on the completion of this procedure. Each device may confirm that the function to perform the network-initiated handover is temporarily disabled, or confirm that the mobility-on-demand function corresponding to the state not allowing the network-initiated handover to be performed is enabled, based on the completion of this procedure.

In the case of transmitting and/or receiving the eleventh identification information, each device may confirm that the temporarily prohibiting of the network-initiated handover is not allowed, or confirm that the function to perform the network-initiated handover cannot be disabled, based on the completion of this procedure.

The determinations on the first to third conditions described above may be made based on the identification information included in the PDU session establishment request message and/or subscriber information and/or operator policy. The conditions for determining whether the first to third conditions are true or false may not be limited to the above described conditions.

For example, the first condition and the third condition may be true in a case that the UE_A 10 requests the PDU session with the UE-initiated handover being supported to be established and the network allows the request. The first condition and the third condition may be false in a case that the UE_A 10 requests the PDU session with the UE-initiated handover being supported to be established and the network does not allow the request.

1.3.3. Attach Procedure Example

Figure 16:
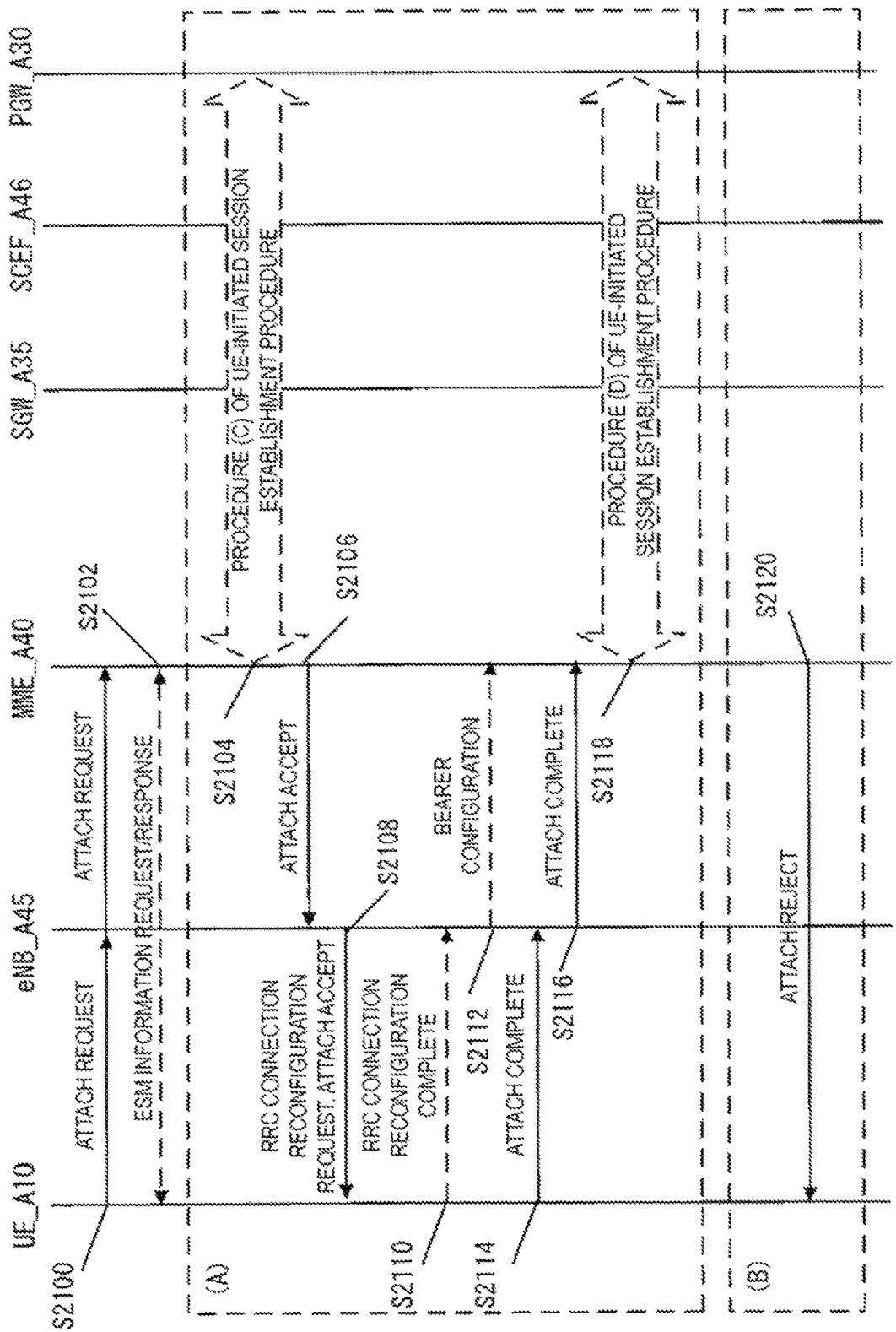
FIG. 16 is a diagram illustrating an attach procedure.

An example of steps of performing the attach procedure will be described using FIG. 16. Hereinafter, steps of this procedure will be described. First, the UE_A 10 transmits an attach request message to the MME_A 40 via the eNB_A 45 to start the attach procedure (S2100). The UE_A 10 may transmit the attach request message including the PDU session establishment request message described above, or include the PDU session establishment request message to request to perform the PDU session establishment procedure during the attach procedure.

Here, the UE_A 10 may include at least the first identification information and/or the third identification information in the attach request message, or include these pieces of identification information to request the UE-initiated handover to be supported and/or enabled. The UE_A 10 may include the first identification information and/or the third identification information in the attach request message to indicate that the UE_A 10 has the function to perform the UE-initiated handover and/or the mobility-on-demand function corresponding to the UE-initiated handover, or indicate the mobility level corresponding to the UE-initiated handover.

The UE_A 10 may include the first identification information and/or the third identification information in the attach request message to request to enable the function to perform the UE-initiated handover, or request to change its state to the state capable of performing the UE-initiated handover. The UE_A 10 may request to enable the mobility-on-demand function corresponding to the UE-initiated handover, or request to change to the mobility level corresponding to the UE-initiated handover.

The UE_A 10 may include at least the ninth identification information in the attach request message, or include the identification information to request to temporarily prohibit and/or not perform the network-initiated handover. The UE_A 10 may include the ninth identification information in the attach request message to request to temporarily disable the function to perform the network-initiated handover, or request to temporarily change its state to the state not allowing the network-initiated handover to be performed.

The UE_A 10 may include the ninth identification information in the attach request message to request to enable the mobility-on-demand function corresponding to the state not allowing the network-initiated handover to be performed, or request to transit to the mobility level corresponding to this state.

The UE_A 10 may transmit these pieces of identification information while including them in the control message different from the attach request. For example, the UE_A 10 may transmit these pieces of identification information while including them in an ESM information response message (S2102) that is a response message to an EPS Session Management (ESM) information request message.

The MME_A 40 receives the attach request message and/or the ESM information response message to determine the first condition. The MME_A 40 starts a procedure (A) in this procedure in a case that the first condition is true, or starts a procedure (B) in this procedure in a case that the first condition is false.

Hereinafter, steps of the procedure (A) in this procedure will be described. The MME_A 40 performs a determination on a fourth condition to start the procedure (A) in this procedure. The MME_A 40 starts the procedure (C) during the UE-initiated PDU session establishment procedure in a case that the fourth condition is true, and omits in a case that the fourth condition is false (S2104). The MME_A 40 transmits the attach accept message to the eNB_A 45, based on the reception of the attach request message and/or create session response message (S2106). In a case that the MME_A 40 receives the create session reject message, the MME_A 40 may not continue the procedure (A) in this procedure to start the procedure (B) in this procedure.

The eNB_A 45 receives the attach accept message and transmits the RRC connection reconfiguration request message and/or the attach accept message to the UE_A 10 (S2108). The attach accept message may be transmitted and/or received while being included in the RRC connection reconfiguration request message. In the case that the fourth condition is true, the MME_A 40 may transmit the attach accept message including the PDU session establishment accept message described above, or may include the PDU session establishment accept message to indicate that the PDU session establishment procedure is accepted.

Here, the MME_A 40 may include at least the second identification information and/or the fourth identification information in the attach accept message, or include these pieces of identification information to indicate that the request from the UE_A 10 is allowed or that the UE-initiated handover is supported and/or enabled. The MME_A 40 may include the second identification information and/or the fourth identification information in the attach accept message to indicate that the MME_A 40 has the function to perform the UE-initiated handover and/or the mobility-on-demand function corresponding to the UE-initiated handover, or indicate the mobility level corresponding to the UE-initiated handover.

The MME_A 40 may include the second identification information and/or the fourth identification information in the attach accept message to indicate that the enabling of the function to perform the UE-initiated handover is allowed, or indicate that the change its state to the state capable of performing the UE-initiated handover is allowed. The MME_A 40 may further indicate that the enabling of the mobility-on-demand function corresponding to the UE-initiated handover is allowed, or indicate that the transit to the mobility level corresponding to the UE-initiated handover is allowed.

The MME_A 40 and/or the eNB_A 45 may include at least the seventh identification information in the attach accept message, or may include the seventh identification information to request to temporarily prohibit the UE-initiated handover procedure. The MME_A 40 and/or the eNB_A 45 may include the seventh identification information in the attach accept message to request to temporarily disable the function to perform the UE-initiated handover, or request to temporarily change its state to the state not allowing the UE-initiated handover to be performed.

The MME_A 40 and/or the eNB_A 45 may include the seventh identification information in the attach accept message to request to enable the mobility-on-demand function corresponding to the state not allowing the UE-initiated handover to be performed, or request to transit to the mobility level corresponding to this state.

The MME_A 40 may include at least the tenth identification information in the attach accept message, or may include the identification information to indicate that the request to temporarily prohibit the network-initiated handover procedure is allowed. The MME_A 40 may include the tenth identification information in the attach accept message to indicate that the temporarily disabling of the function to perform the network-initiated handover is allowed, or that the temporary transition to the state not allowing the network-initiated handover to be performed is allowed.

The MME_A 40 may include the tenth identification information in the attach accept message to indicate that the enabling of the mobility-on-demand function corresponding to the state not allowing the network-initiated handover to be performed is allowed, or indicate that the transition to the mobility level corresponding to this state is allowed.

Here, the determinations on the first to third conditions may be the same as the determinations on the first to third conditions during the UE-initiated PDU session establishment procedure. The determination on the fourth condition is for the MME_A 40 to determine whether to perform the PDU session establishment procedure. The case that the fourth condition is true is a case that the PDU session establishment request message is received and may be a case that the UE-initiated PDU session establishment procedure is also performed in this procedure. The case that the fourth condition is false is a case that the PDU session establishment request message is not received, and may be a case that the UE-initiated PDU session establishment procedure is not performed in this procedure and may be a case that the fourth condition is not determined to be true.

In a case that UE_A 10 receives the RRC connection reconfiguration request message, the UE_A 10 transmits the RRC connection reconfiguration request message to the eNB_A 45 (S2110). The eNB_A 45 receives the RRC connection reconfiguration request message and transmits a bearer setup message to the MME_A 40 (S2112). The MME_A 40 receives the bearer setup message.

In a case that the UE_A 10 receives the attach accept message, the UE_A 10 transmits an attach complete message to the MME_A 40 via the eNB_A 45 (S2114) (S2116). The MME_A 40 receives the attach complete message. In the case that the fourth condition is true, the MME_A 40 starts a procedure (D) during the UE-initiated PDU session establishment procedure (S2118). Each device completes the procedure (A) in this procedure, based on the transmission and/or reception of the attach complete message and/or the completion of the procedure (D) during the UE-initiated PDU session establishment procedure.

In a case that the UE_A 10 receives the PDU session establishment accept message, the UE_A 10 may transmit the attach complete message including the PDU session establishment complete message described above, or include the PDU session establishment complete message to indicate that the PDU session establishment procedure is completed.

The UE_A 10 may include at least the eighth identification information in the attach complete message, or may include the eighth identification information to indicate that the request to temporarily prohibit the UE-initiated handover procedure is allowed. The UE_A 10 may include the eighth identification information in the attach complete message to indicate that the temporarily disabling of the function to perform the UE-initiated handover is allowed, or indicate that the temporary transition to the state not allowing the UE-initiated handover to be performed is allowed.

The UE_A 10 may include the eighth identification information in the attach complete message to indicate that the enabling of the mobility-on-demand function corresponding to the state not allowing the UE-initiated handover to be performed is allowed, or indicate that the transition to the mobility level corresponding to this state is allowed.

Next, steps of the procedure (B) in this procedure, will be described. The MME_A 40 transmits the attach reject message to the UE_A 10 via the eNB_A 45 and starts the procedure (B) in this procedure (S2120). The UE_A 10 receives the attach reject message to confirm that the request from the UE_A 10 is rejected. Each device completes the procedure (B) in this procedure, based on the transmission and/or reception of the attach reject message. In the case that the fourth condition is true, the MME_A 40 may transmit the attach reject message including the PDU session establishment reject message described above, or may include the PDU session establishment reject message to indicate that the PDU session establishment procedure is rejected.

The MME_A 40 may include at least the fifth identification information in the attach reject message, or include the identification information to indicate that the request from the UE_A 10 is not allowed or that the UE-initiated handover is not supported and/or not enabled. The MME_A 40 may include the fifth identification information in the attach accept message to indicate that the MME_A 40 does not have the function to perform the UE-initiated handover and/or the mobility-on-demand function corresponding to the UE-initiated handover, or indicate the mobility level not having the UE-initiated handover function.

The MME_A 40 may include at least the eleventh identification information in the attach reject message, or may include the identification information to indicate that the request from the UE_A 10 is not allowed. The MME_A 40 may include the eleventh identification information in the attach reject message to indicate that the temporarily prohibiting of the network-initiated handover is not allowed, or indicate that the transition to the state not allowing the network-initiated handover to be performed is not allowed.

The MME_A 40 may include the eleventh identification information in the attach reject message to indicate that the enabling of the mobility-on-demand function corresponding to the state not allowing the network-initiated handover to be performed is not allowed, or indicate that the transition to the mobility level corresponding to this state is not allowed.

Each device completes this procedure, based on the completion of the procedure (A) or (B), in this procedure. Each device may change its state to the state where the UE_A 10 is connected to the network and/or the registered state, based on the completion of the procedure (A) in this procedure, or may confirm that this procedure is rejected, based on the completion of the procedure (B), in this procedure. The transition to each state by each device may be performed based on the completion of this procedure or based on the PDU session establishment.

Each device may determine whether to enable the UE-initiated handover, based on the completion of this procedure. In other words, each device may enable the UE-initiated handover in the case of transmitting or receiving the second identification information and/or the fourth identification information, or may not enable in the case of transmitting and/or receiving the fifth identification information.

In the case of transmitting and/or receiving the second identification information and/or the fourth identification information, each device may enable the function to perform the UE-initiated handover, or may change its state to the state capable of performing the UE-initiated handover. Each device may enable the mobility-on-demand function corresponding to the UE-initiated handover, or transit to the mobility level corresponding to the UE-initiated handover.

In the case of transmitting and/or receiving the fifth identification information, each device may disable the function to perform the UE-initiated handover, or may change its state to the state incapable of performing the UE-initiated handover. Each device may disable the mobility-on-demand function corresponding to the UE-initiated handover, or transit to the mobility level not having the UE-initiated handover function.

In the case of transmitting and/or receiving the eighth identification information, each device may temporarily prohibit the UE-initiated handover procedure, change its state to a state temporarily not allowing the UE-initiated handover, or change to the mobility level corresponding to this state, based on the completion of this procedure. Each device may confirm that the function to perform the UE-initiated handover is temporarily disabled, or confirm that the mobility-on-demand function corresponding to the state not allowing the UE-initiated handover to be performed is enabled, based on the completion of this procedure.

In the case of transmitting and/or receiving the tenth identification information, each device may temporarily prohibit the network-initiated handover procedure, change its state to a state temporarily not allowing the network-initiated handover, or change to the mobility level corresponding to this state, based on the completion of this procedure. Each device may confirm that the function to perform the network-initiated handover is temporarily disabled, or confirm that the mobility-on-demand function corresponding to the state not allowing the network-initiated handover to be performed is enabled, based on the completion of this procedure.

In the case of transmitting and/or receiving the eleventh identification information, each device may confirm that the temporarily prohibiting of the network-initiated handover is not allowed, or confirm that the function to perform the network-initiated handover cannot be disabled, based on the completion of this procedure.

The determinations on the first to fourth conditions described above may be made based on the identification information included in the attach request message and/or subscriber information and/or operator policy. The conditions for determining whether the first to fourth conditions are true or false may not be limited to the above described conditions.

For example, the first condition and the third condition may be true in a case that the UE_A 10 requests the UE-initiated handover to be enabled and the network allows the request. The first condition and the third condition may be false in a case that the UE_A 10 requests the UE-initiated handover to be enabled and the network does not allow the request.

1.3.4. Handover Configuration Change Procedure Example

Next, an example of the handover configuration change procedure will be described. This procedure is a procedure for updating a configuration of each device of each device for the handover procedure. Each device can perform this procedure at any timing in a case that the UE_A 10 is in a state connecting to the core network_A 90 and/or in a state establishing the PDU session. In other words, each device can start this procedure in the state where the attach procedure is completed and/or in the registered state. Based on the completion of this procedure, each device may change its state to the state not allowing the UE-initiated handover or the state not allowing the network-initiated handover.

This procedure may be initiated by the UE_A 10 to be performed, or initiated by the network to be performed. For example, the network may perform this network-initiated procedure, based on detecting a change in the subscriber information or operator policy, or may perform this network-initiated procedure, based on receiving the control message from the UE_A 10. The UE_A 10 may detect a configuration change of itself to perform this UE_A 10-initiated procedure.

1.3.4.1. Network-Initiated Handover Configuration Change Procedure Example

Figure 18:
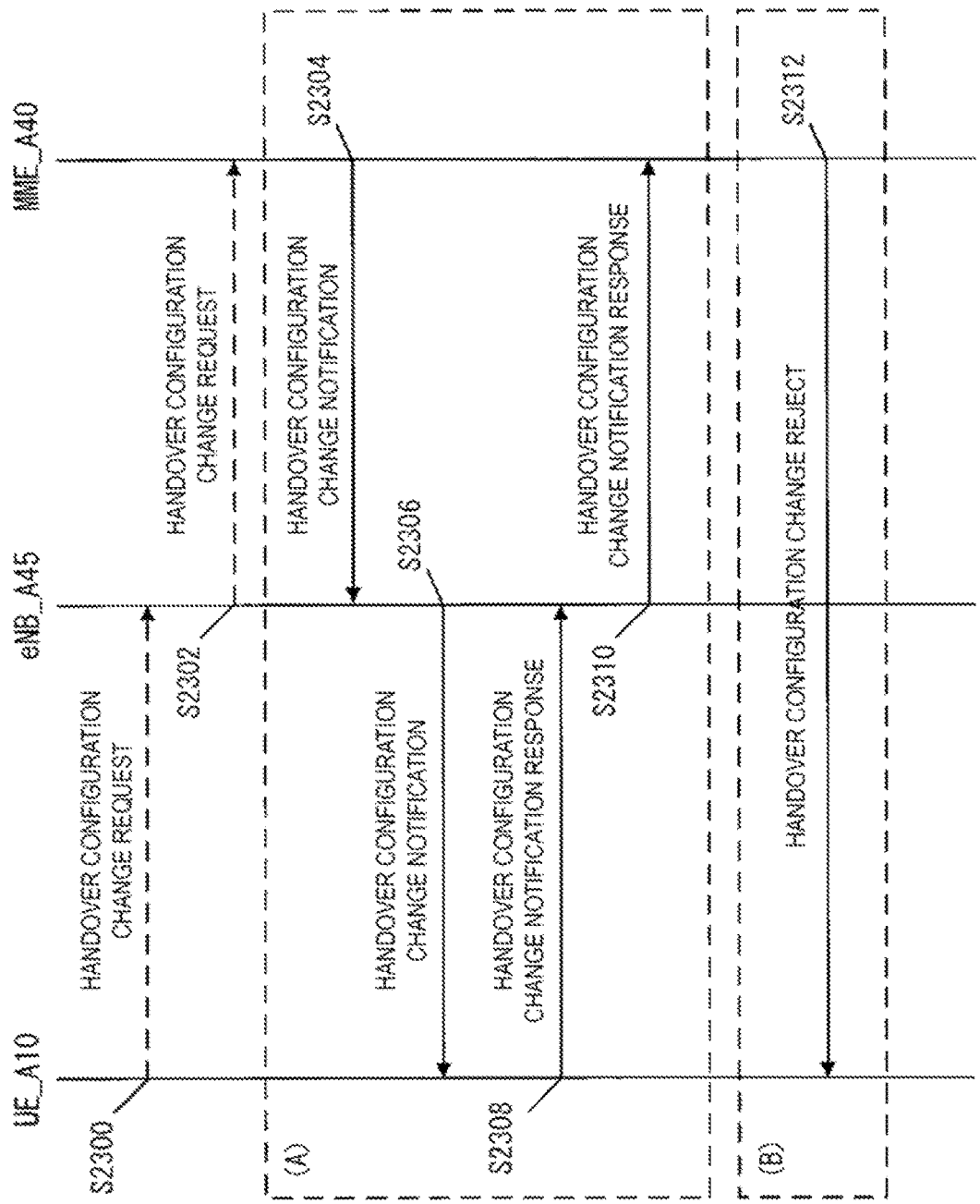
FIG. 18 a diagram illustrating a handover configuration change establishment procedure.

An example of steps of the handover configuration change procedure initiated by the network to be performed will be described with reference to FIG. 18. Hereinafter, steps of this procedure will be described. First, the MME_A 40 transmits a handover configuration change notification message to the eNB_A 45 to start this procedure (S2304). The eNB_A 45 receives the handover configuration change notification message and transmits the handover configuration change notification message to the UE_A 10 (S2306).

Here, the MME_A 40 may start this procedure not based on the reception of the control messages from the UE_A 10 and/or eNB_A 45 but based on the updates of the subscriber information, the operator policy, and the like, or start this procedure based on the reception of the control messages from the UE_A 10 and/or eNB_A 45.

The MME_A 40 and/or the eNB_A 45 may include at least the seventh identification information in the handover configuration change notification message, or may include the seventh identification information to request to temporarily prohibit the UE-initiated handover procedure. The MME_A 40 and/or the eNB_A 45 may include the seventh identification information in the handover configuration change notification message to request to temporarily disable the function to perform the UE-initiated handover, or request to temporarily change its state to the state not allowing the UE-initiated handover to be performed.

The MME_A 40 and/or the eNB_A 45 may include the seventh identification information in the handover configuration change notification message to request to enable the mobility-on-demand function corresponding to the state not allowing the UE-initiated handover to be performed, or request to transit to the mobility level corresponding to this state.

The UE_A 10 receives the handover configuration change notification message and transmits a handover configuration change notification response message to the eNB_A 45 (S2308). The eNB_A 45 receives the handover configuration change notification response message and transmits the handover configuration change notification response message to the MME_A 40 (S2310). The MME_A 40 receives the handover configuration change notification response message. Each device completes this procedure, based on the transmission and/or reception of the handover configuration change notification response message and confirms that the request from the network is accepted.

Here, the UE_A 10 may include at least the eighth identification information in the handover configuration change notification response message, or include the eighth identification information to indicate that the request to temporarily prohibit the UE-initiated handover procedure is allowed. The UE_A 10 may include the eighth identification information in the handover configuration change notification response message to indicate that the temporarily disabling of the function to perform the UE-initiated handover is allowed, or indicate that the temporary transition to the state not allowing the UE-initiated handover to be performed is allowed.

The UE_A 10 may include the eighth identification information in the handover configuration change notification response message to indicate that the enabling of the mobility-on-demand function corresponding to the state not allowing the UE-initiated handover to be performed is allowed, or indicate that the transition to the mobility level corresponding to this state is allowed.

Each device may temporarily prohibit the UE-initiated handover procedure, change its state to a state temporarily not allowing the UE-initiated handover, or change to the mobility level corresponding to this state, based on the completion of this procedure. Each device may confirm that the function to perform the UE-initiated handover is temporarily disabled, or confirm that the mobility-on-demand function corresponding to the state not allowing the UE-initiated handover to be performed is enabled, based on the completion of this procedure.

1.3.4.2. UE-Initiated Handover Configuration Change Procedure Example

An example of steps of the handover configuration change procedure initiated by the UE_A 10 will be described with reference to FIG. 18. Hereinafter, steps of this procedure will be described. First, the UE_A 10 transmits the handover configuration change request message to the eNB_A 45 to start the UE-initiated handover configuration change procedure (S2300). The eNB_A 45 receives the handover configuration change request message and transmits the handover configuration change request message to the MME_A 40 (S2302).

Here, the UE_A 10 may include at least the ninth identification information in the handover configuration change request message, or include the identification information to request to temporarily prohibit and/or not perform the network-initiated handover. The UE_A 10 may include the ninth identification information in the handover configuration change request message to request to temporarily disable the function to perform the network-initiated handover, or request to temporarily change its state to the state not allowing the network-initiated handover to be performed.

The UE_A 10 may include the ninth identification information in the handover configuration change request message to request to enable the mobility-on-demand function corresponding to the state not allowing the network-initiated handover to be performed, or request to transit to the mobility level corresponding to this state.

The handover configuration change request message may be a tracking area update request message, and the UE_A 10 may transmit the ninth identification information while including it in the tracking area update request message.

The MME_A 40 receives the handover configuration change request message to determine the first condition. The MME_A 40 starts a procedure (A) in this procedure, in a case that the first condition is true, or starts a procedure (B) in this procedure, in a case that the first condition is false. Here, the determination on the first condition may be the same as the determination on the first condition during the UE-initiated PDU session establishment procedure. The procedure (A) in this procedure may be the same as the network-initiated handover configuration change procedure.

In the procedure (A) in this procedure, the MME_A 40 may include at least the tenth identification information in the handover configuration change notification message, or include the identification information to indicate that the request to temporarily prohibit the network-initiated handover procedure is allowed. The MME_A 40 may include the tenth identification information in the handover configuration change notification message to indicate that the temporarily disabling of the function to perform the network-initiated handover is allowed, or indicate that the temporary transition to the state not allowing the network-initiated handover to be performed is allowed.

The MME_A 40 may include the tenth identification information in the handover configuration change notification message to indicate that the enabling of the mobility-on-demand function corresponding to the state not allowing the network-initiated handover to be performed is allowed, or indicate that the transition to the mobility level corresponding to this state is allowed.

The handover configuration change notification message may be a tracking area update accept message, and the MME_A 40 may transmit the tenth identification information while including it in the tracking area update accept message.

Next, steps of the procedure (B) in this procedure, will be described. The MME_A 40 transmits the handover configuration change reject message to the UE_A 10 via the eNB_A 45 and starts the procedure (B) in this procedure (S2312). The UE_A 10 receives the handover configuration change reject message to confirm that the request from the UE_A 10 is rejected. Each device completes the procedure (B) in this procedure, based on the transmission and/or reception of the handover configuration change reject message.

Here, the MME_A 40 may include at least the eleventh identification information in the handover configuration change reject message, or may include the identification information to indicate that the request from the UE_A 10 is not allowed. The MME_A 40 may include the eleventh identification information in the handover configuration change reject message to indicate that the temporarily prohibiting of the network-initiated handover is not allowed, or indicate that the transition to the state not allowing the network-initiated handover to be performed is not allowed.

The MME_A 40 may include the eleventh identification information in the handover configuration change reject message to indicate that the enabling of the mobility-on-demand function corresponding to the state not allowing the network-initiated handover to be performed is not allowed, or indicate that the transition to the mobility level corresponding to this state is not allowed.

The handover configuration change request message may be a tracking area update reject message, and the MME_A 40 may transmit the eleventh identification information while including it in the tracking area update reject message.

Each device completes this procedure, based on the completion of the procedure (A) or (B) in this procedure. Each device may temporarily prohibit the network-initiated handover procedure, based on the completion of the procedure (A) in this procedure, or change its state to the state not allowing temporarily the network-initiated handover procedure. Each device may confirm that the request to temporarily prohibit the network-initiated handover procedure is rejected, based on the completion of (B) in this procedure.

Each device may temporarily prohibit the network-initiated handover procedure, change its state to a state not allowing temporarily the network-initiated handover, or change to the mobility level corresponding to this state, based on the transmission and/or reception of the tenth identification information. Each device may confirm that the function to perform the network-initiated handover is temporarily disabled, or confirm that the mobility-on-demand function corresponding to the state not allowing the network-initiated handover to be performed is enabled, based on the transmission and/or reception of the tenth identification information.

Each device may confirm that the temporarily prohibiting of the network-initiated handover is not allowed, or confirm that the function to perform the network-initiated handover cannot be disabled, based on the transmission and/or reception of the eleventh identification information.

1.3.5. Handover Procedure Example

Next, an example of the handover procedure will be described. This procedure is a procedure for switching the network to which the UE_A 10 connects. Each device can perform this procedure at any timing in a case that the UE_A 10 is in a state connecting to the core network_A 90 and/or in a state establishing the PDU session.

Based on the completion of this procedure, the device in access network to which the UE_A 10 connects is changed from the eNB_A 45 to an eNB_B 145. The PDU session established by the UE_A 10 is also changed from the connectivity via the eNB_A 45 to connectivity via the eNB_B 145. The eNB_B 145 may have the same configuration as the eNB_A 45, or the same configuration as the NextGen BS_A 122 or the WAG_A 126.

This procedure may be initiated by the UE_A 10 to be performed, or initiated by the network to be performed. For example, the network may detect that the UE_A 10 moves and perform this network-initiated procedure. The UE_A 10 may detect that the change of the network state and perform the UE-initiated procedure. This UE-initiated procedure may include a first UE-initiated handover procedure and a second UE-initiated handover procedure.

1.3.5.1. Network Initiate Handover Procedure Example

Figure 19:
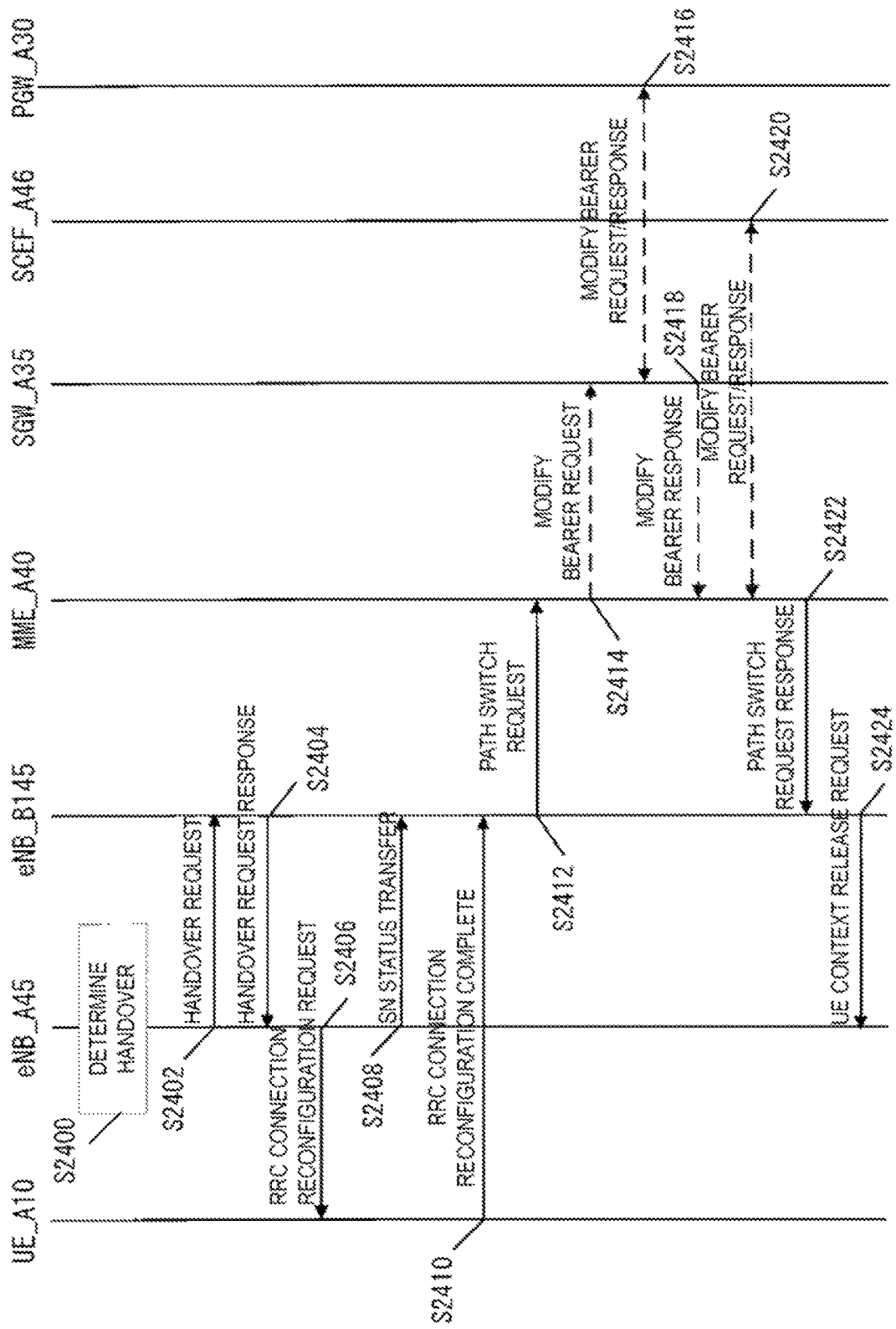
FIG. 19 is a diagram illustrating a network-initiated handover establishment procedure.

An example of steps of the handover procedure initiated by the network to be performed will be described with reference to FIG. 19. Hereinafter, steps of this procedure will be described. First, the eNB_A 45 determines to perform the handover procedure, transmits a handover request message to the eNB_B 145, and starts the network-initiated handover procedure (S2400) (S2402).

Here, the eNB_A 45 may determine the handover procedure, based on the reception of the control message from the UE_A 10 and/or MME_A 40 and/or the update of the operator policy or subscriber information, or detect that the UE_A 10 moves to determine to perform the handover procedure. In the case that the network-initiated handover is allowed, the eNB_A 45 may perform this procedure.

The eNB_B 145 receives the handover request message and transmits a handover request response message to the eNB_A 45 (S2404). The eNB_A 45 receives the handover request response message, transmits the RRC connection reconfiguration request message to the UE_A 10, and transmits an SN status transfer message to the eNB_B 145 (S2406) (S2408). The UE_A 10 receives the RRC connection reconfiguration request message and transmits an RRC connection reconfiguration complete message to the eNB_B 145 (S2410).

The eNB_B 145 receives the SN status transfer message and/or an RRC connection reconfiguration complete and transmits a path switch request message to the MME_A 40 (S2412). The MME_A 40 receives the path switch request message to determine a fifth condition.

In a case that the fifth condition is true, the MME_A 40 transmits the modify bearer request message to the SGW_A 35 (S2414). The SGW_A 35 receives the modify bearer request message. The SGW_A 35 may transmit the modify bearer request message to the PGW_A 30, based on the reception of the modify bearer request message (S2416). The PGW_A 30 may receive the modify bearer request message and transmit the modify bearer response message to the SGW_A 35 (S2416). The SGW_A 35 may receive the modify bearer response message. The SGW_A 35 transmits the modify bearer response message to the MME_A 40, based on the reception of the modify bearer request message and/or the modify bearer response message (S2418).

In a case that the fifth condition is false, the MME_A 40 may transmit the modify bearer request message to the SCEF_A 46 (S2420). The SCEF_A 46 may receive the modify bearer request message and transmit the modify bearer response message from and to the MME_A 40 (S2420).

Here, the determination on the fifth condition is for the MME_A 40 to authenticate a type of the established PDU session. The case that the fifth condition is true may be a case that the established PDU session is the first type of PDU session. The case that the fifth condition is false may be a case that the established PDU session is the second type of PDU session and a case that the fifth condition is not determined to be true. The condition for determining whether the fifth condition is true or false may not be limited to the above-described conditions.

The MME_A 40 transmits a path switch request response message to the eNB_B 145, based on the reception of the path switch request message and/or the modify bearer response message (S2422). The eNB_B 145 receives the path switch request response message and transmits a UE context release request message to the eNB_A 45 (S2424). The eNB_A 45 receives the UE context release request message and releases the context and/or resource associated with the UE_A 10.

Each device completes this procedure, based on the transmission and/or reception of the UE context release request message and/or the release of the resource associated with the UE_A 10, and changes a connection destination of the UE_A 10 and/or changes the device via which the established PDU session passes from the eNB_A 45 to the eNB_B 145.

1.3.5.2. First UE-Initiated Handover Procedure Example

Figure 20:
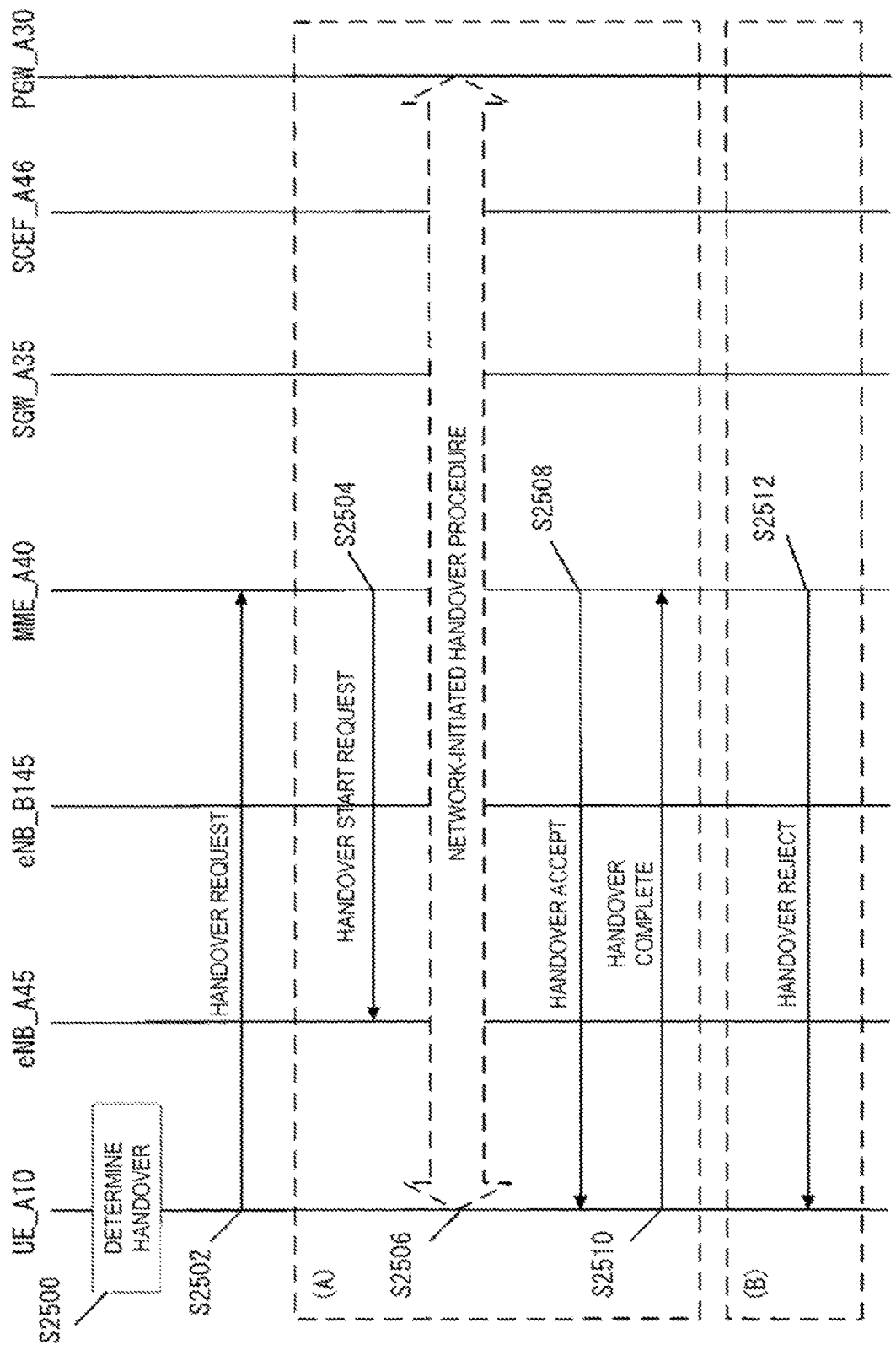
FIG. 20 is a diagram illustrating a first UE-initiated handover establishment procedure.

An example of steps of the first handover procedure initiated by the UE_A 10 to be performed will be described with reference to FIG. 20. Hereinafter, steps of this procedure will be described. First, the UE_A 10 determines to perform the handover procedure, transmits the handover request message to the MME_A 40 via the eNB_A 45, and starts this procedure (S2500) (S2502).

Here, the UE_A 10 may detect that the change of the network state to start this procedure, or may start this procedure not based on the reception of the control message from the eNB_A 45 and/or MME_A 40. The UE_A 10 may perform this procedure in the case of receiving the second identification information and/or the fourth identification information in the attach procedure and/or the PDU session establishment procedure, or in the case that the UE-initiated handover is allowed.

Here, the UE_A 10 may include at least the sixth identification information in the handover request message, or include the identification information to request the UE-initiated handover or indicate that the handover procedure to start is the UE-initiated handover. The UE_A 10 may include the sixth identification information in the handover request message to request to start the network-initiated handover procedure.

The MME_A 40 receives the handover request message to determine the first condition. The MME_A 40 starts a procedure (A) in this procedure, in a case that the first condition is true, or starts a procedure (B) in this procedure, in a case that the first condition is false. Here, the determination on the first condition may be the same as the determination on the first condition during the UE-initiated PDU session establishment procedure.

Hereinafter, steps of the procedure (A) in this procedure will be described. The MME_A 40 transmits a handover start request message to the eNB_A 45 to start the procedure (A) in this procedure (S2504). The eNB_A 45 receives the handover start request message and starts the network-initiated handover procedure described above (S2506).

The MME_A 40 transmits a handover accept message to the UE_A 10 via the eNB_B 145, based on the completion of the network-initiated handover procedure (S2508). The UE_A 10 receives the handover accept message and transmits a handover complete message to the MME_A 40 via the eNB_B 145 (S2510). The MME_A 40 receives the handover complete message. Each device completes the procedure (A) in this procedure based on the transmission and/or reception of the handover complete message.

Next, steps of the procedure (B) in this procedure, will be described. The MME_A 40 transmits a handover reject message to the UE_A 10 via the eNB_A 45 and starts the procedure (B) in this procedure (S2512). The UE_A 10 receives the handover reject message to confirm that the request from the UE_A 10 is rejected. Each device completes the procedure (B) in this procedure, based on the transmission and/or reception of the handover reject message.

Here, the MME_A 40 may include at least the eleventh identification information in the handover reject message, or include the identification information to indicate that the request from the UE_A 10 is not allowed or that the UE-initiated handover is not performed.

Each device completes this procedure, based on the completion of the procedure (A) or (B) in this procedure. Each device may change the connection destination of the UE_A 10 and/or change the device via which the established PDU session passes from the eNB_A 45 to the eNB_B 145, based on the completion of (A) in this procedure, or confirm that the UE-initiated handover request is rejected based on the completion of (B) in this procedure.

1.3.5.3. Second UE-Initiated Handover Procedure Example

Figure 21:
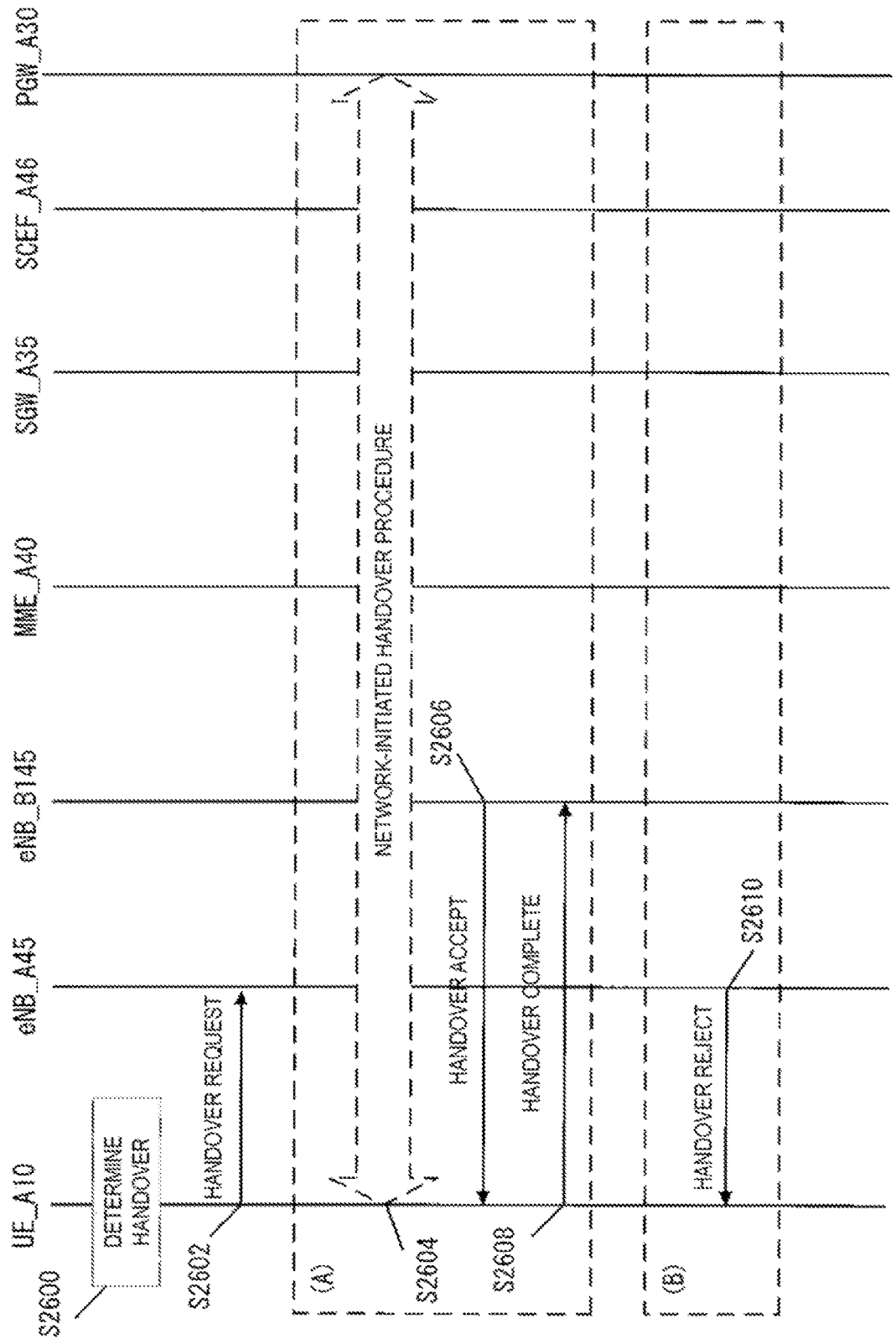
FIG. 21 is a diagram illustrating a second UE-initiated handover establishment procedure.

An example of steps of the second handover procedure initiated by the UE_A 10 to be performed will be described with reference to FIG. 21. Hereinafter, steps of this procedure will be described. First, the UE_A 10 determines to perform the handover procedure, transmits the handover request message to the eNB_A 45, and starts this procedure (S2600) (S2602).

Here, the UE_A 10 may detect that the change of the network state to start this procedure, or may start this procedure not based on the reception of the control message from the eNB_A 45 and/or MME_A 40. The UE_A 10 may perform this procedure in the case of receiving the second identification information and/or the fourth identification information in the attach procedure and/or the PDU session establishment procedure, or in the case that the UE-initiated handover is allowed.

Here, the UE_A 10 may include at least the sixth identification information in the handover request message, or include the identification information to request the UE-initiated handover or indicate that the handover procedure to start is the UE-initiated handover. The UE_A 10 may include the sixth identification information in the handover request message to request to start the network-initiated handover procedure.

The eNB_A 45 receives the handover request message to determine a sixth condition. The MME_A 40 starts a procedure (A) in this procedure, in a case that the sixth condition is true, or starts a procedure (B) in this procedure, in a case that the sixth condition is false.

Here, the determination on the sixth condition is for the eNB_A 45 to determine whether to accept the request from the UE_A 10. The case that the sixth condition is true is a case that the request from the UE_A 10 is accepted and may be a case that the request from the UE_A 10 is allowed. The case that the sixth condition is false is a case that the request from the UE_A 10 is rejected and may be a case that the sixth condition is not determined to be true.

Hereinafter, steps of the procedure (A) in this procedure, will be described. The eNB_A 45 starts the network-initiated handover procedure described above to start the procedure (A) in this procedure (S2604).

The eNB_B 145 transmits the handover accept message to the UE_A 10, based on the completion of the network-initiated handover procedure (S2606). The UE_A 10 receives the handover accept message and transmits the handover complete message to the eNB_B 145 (S2608). The eNB_B 145 receives the handover complete message. Each device completes the procedure (A) in this procedure, based on the transmission and/or reception of the handover complete message.

Next, steps of the procedure (B) in this procedure, will be described. The eNB_A 45 transmits the handover reject message to the UE_A 10 and starts the procedure (B) in this procedure (S2512). The UE_A 10 receives the handover reject message to confirm that the request from the UE_A 10 is rejected. Each device completes the procedure (B) in this procedure, based on the transmission and/or reception of the handover reject message.

Here, the eNB_A 45 may include at least the eleventh identification information in the handover reject message, or include the identification information to indicate that the request from the UE_A 10 is not allowed or that the UE-initiated handover is not performed.

Each device completes this procedure, based on the completion of the procedure (A) or (B) in this procedure. Each device may change the connection destination of the UE_A 10 and/or change the device via which the established PDU session passes from the eNB_A 45 to the eNB_B 145, based on the completion of procedure (A) in this procedure, or confirm that the UE-initiated handover request is rejected based on the completion of (B) in this procedure.

1.3.6. Modification Example of Present Embodiment

Each device in the present embodiment may be a device different from those described above. For example, the MME_A 40 is a device serving a function of the management of the mobility of each device such as the UE_A 10 and/or the management of the session between the devices, but in the core network_A 90 in the present embodiment, the function of the mobility management and the function of the session management may be served by devices different from each other.

Specifically, a Session Management Entity (SME) may serve the function of the session management of the MME_A 40. In this case, the MME_A 40 in the present embodiment can be replaced with the Session Management Entity (SME). Furthermore, the messages transmitted and/or received by the MME_A 40 described in the communication procedure in the present embodiment may be transmitted and/or received by the SME, and the processing performed by the MME_A 40 may be performed by the SME.

The eNB_A 45 and/or the eNB_B 145 in the present embodiment may be not the device in the E-UTRAN_A 80 but a device in another access network. For example, the eNB_A 45 and/or the eNB_B 145 may be the NextGen BS_A 120 or the WAG_A 126.

2. Modified Example

A program running on an apparatus according to the present invention may serve as a program that controls a Central Processing Unit (CPU) and the like to cause a computer to operate in such a manner as to realize the functions of the embodiment according to the present invention. A program or information handled by the program is transitorily stored in a volatile memory such as a Random Access Memory (RAM), a non-volatile memory such as a flash memory, a Hard Disk Drive (HDD), or other storage device systems.

The program for implementing the functions according the embodiment of the present invention may be recorded on a computer-readable recording medium. The functions may be implemented by causing a computer system to read the program recorded on this recording medium for execution. It is assumed that the "computer system" refers to a computer system built into the devices, and the computer system includes an operating system and hardware components such as a peripheral device. The "computer-readable recording medium" may include a semiconductor recording medium, an optical recording medium, a magnetic recording medium, a medium dynamically holding a program for a short time, or other computer-readable recording media.

The respective functional blocks or features of the devices used in the above-described embodiment may be installed or performed by an electrical circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. Although the general-purpose processor may be a microprocessor, a processor of a known type, a controller, a micro-controller, or a state machine. The electrical circuit described above may be constituted by a digital circuit, or an analog circuit. Furthermore, in a case that with advances in semiconductor technology, a circuit integration technology with which the current integrated circuit is replaced appears, one or multiple aspects according to the present invention can also use a new integrated circuit based on the relevant technology.

Note that the invention of the present patent application is not limited to the above-described embodiments. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

REFERENCE SIGNS LIST

1 Mobile communication system
5 PDN_A
10 UE_A
20 UTRAN_A
22 NB_A
24 RNC_A
25 GERAN_A
26 BSS_A
30 PGW_A
35 SGW_A
40 MME_A
45 eNB_A
46 SCEF_A
50 HSS_A 55 AAA_A
60 PCRF_A
65 ePDG_A
70 WLAN ANa
72 WLAN APa
74 TWAG_A
75 WLAN ANb
76 WLAN APb
80 E-UTRAN_A
90 Core network_A
120 NextGen RAN_A
122 NextGen BS_A
125 WLAN ANc
126 WAG_A
145 eNB_B

The invention claimed is:

1. A User Equipment (UE) comprising:
transmission and reception circuitry configured for: in a UE-initiated handover procedure from a first network to a second network, receiving from the first network a Packet Data Unit (PDU) session establishment accept message including first information indicating that a (PDU) session is allowed to communicate with an Evolved Packet System (EPS) bearer mapped to the second network, wherein the PDU session establishment accept message is a radio resource control (RRC) message received from a base station associated with the first network; and
a controller configured for: based on the reception of the first information, initiating the handover procedure in which a connection of the PDU session is maintained while the UE is handed over from the first network to the second network.

2. A core network device of a first network comprising:
transmission and reception circuitry configured for: in a UE-initiated handover procedure from the first network to a second network, transmitting a Packet Data Unit (PDU) session establishment accept message including first information to a User Equipment (UE) indicating that a PDU session is allowed to communicate with an Evolved Packet System (EPS) bearer mapped to the second network, wherein the PDU session establishment accept message is a radio resource control (RRC) message transmitted via a base station associated with the first network; and
a controller configured for: based on the first information, implementing the handover procedure in which a connection of the PDU session is maintained while the UE is handed over from the first network to the second network.

3. A communication control method performed by a User Equipment (UE), the communication control method comprising:
in a UE-initiated handover procedure from a first network to a second network, receiving from the first network a PDU session establishment accept message including a first information indicating that a Packet Data Unit (PDU) session is allowed to communicate with an Evolved Packet System (EPS) bearer mapped to the second network, wherein the PDU session establishment accept message is a radio resource control (RRC) message received from a base station associated with the first network; and
based on the reception of the first information, initiating the handover procedure in which a connection of the PDU session is maintained while the UE is handed over from the first network to the second network.

4. A communication control method performed by a core network device of a first network, the communication control method comprising:
in a UE-initiated handover procedure from the first network to a second network, transmitting a Packet Data Unit (PDU) session establishment accept message including first information to a User Equipment (UE) indicating that a PDU session is allowed to communicate with an Evolved Packet System (EPS) bearer mapped to the second network, wherein the PDU session establishment accept message is a radio resource control (RRC) message transmitted via a base station associated with the first network, the first information is indicating that the UE initiates a first procedure when the UE is changing a core network to be connected, and the first procedure is performed for the change of the core network to be connected; and
based on the first information, implementing the handover procedure in which a connection of the PDU session is maintained while the UE is handed over from the first network to the second network.

* * * * *